United States Patent [19]

Satoh et al.

[11] Patent Number: 5,499,068
[45] Date of Patent: Mar. 12, 1996

[54] CAMERA HAVING HAND SHAKE DETECTING FUNCTION AND TRIMMING MODE SELECTING FUNCTION

[75] Inventors: Tatsuya Satoh; Masaki Nagao, both of Tokyo, Japan

[73] Assignee: Olympus Optical Co., Ltd., Tokyo, Japan

[21] Appl. No.: 129,779

[22] Filed: Sep. 30, 1993

[30] Foreign Application Priority Data

Oct. 6, 1992 [JP] Japan .................................. 4-267387
Oct. 20, 1992 [JP] Japan .................................. 4-281455
Aug. 5, 1993 [JP] Japan .................................. 5-194797

[51] Int. Cl.$^6$ .......................... G03B 17/24; G03B 17/00; G03B 17/02
[52] U.S. Cl. .......................... 354/106; 354/202; 354/159
[58] Field of Search .................................. 354/400, 402, 354/195.1, 195.12, 419, 202, 222, 422, 432, 442, 105, 106, 159, 94

[56] References Cited

U.S. PATENT DOCUMENTS

| | | | |
|---|---|---|---|
| 4,774,536 | 9/1988 | Inoue et al. | 354/106 |
| 4,780,735 | 10/1988 | Taniguchi et al. | 354/202 |
| 4,963,907 | 10/1990 | Inoue et al. | 354/222 |
| 5,060,006 | 10/1991 | Taniguchi et al. | 354/419 |
| 5,066,971 | 11/1991 | Kodaira | 354/465 |
| 5,258,799 | 11/1993 | Tanii et al. | 354/402 |
| 5,379,088 | 1/1995 | Ueda et al. | 354/402 |
| 5,416,554 | 5/1995 | Hamada et al. | 354/400 |

FOREIGN PATENT DOCUMENTS 64-55544  3/1989  Japan .

*Primary Examiner*—Michael L. Gellner
*Assistant Examiner*—Nicholas J. Tuccillo
*Attorney, Agent, or Firm*—Frishauf, Holtz, Goodman, Langer & Chick

[57] ABSTRACT

A shake detecting section for detecting a camera shake, a prevention mode selecting section for selecting a shake prevention mode, and a print area setting portion for setting a print area in a trimming photographic operation are connected to a control section. In addition, a print area display section for displaying the print area set by the print area setting section in the finder of a camera, a focal length information storage section for storing the focal length information of a photographic lens, and a trimming mode selecting section for selecting a trimming mode are connected to the control section. When the trimming mode is selected by the trimming mode selecting section, the hand shake prevention mode is automatically selected, thereby easily preventing a deterioration in image quality due to a hand shake.

36 Claims, 15 Drawing Sheets

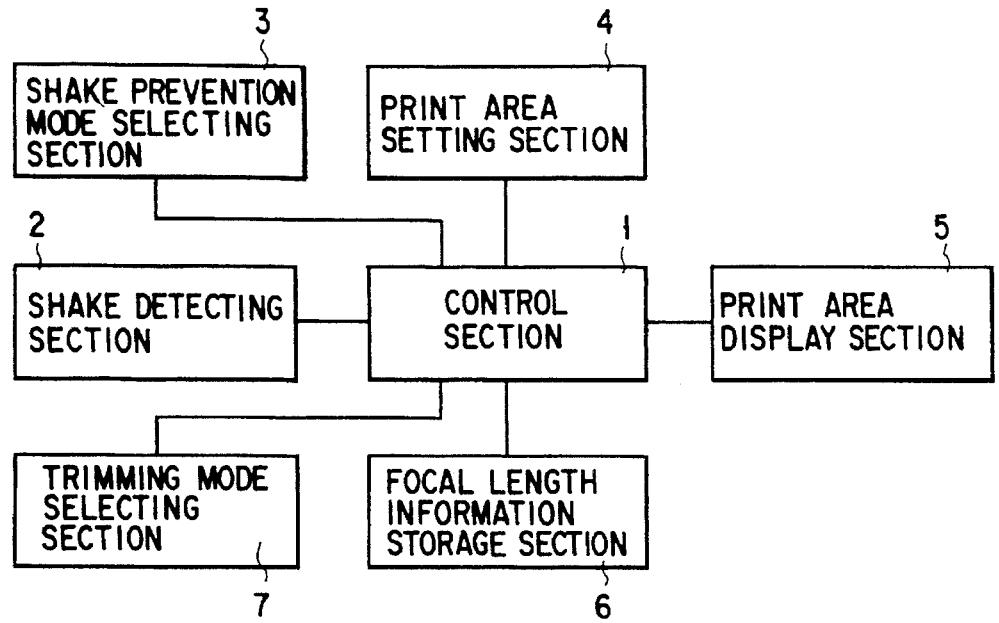
F I G. 1
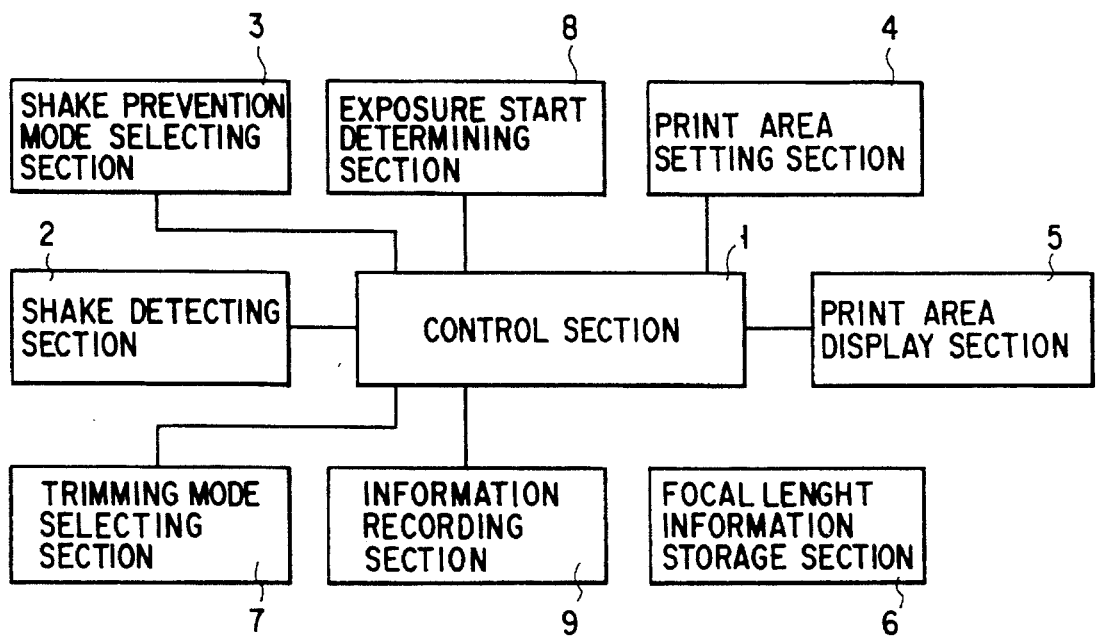
F I G. 2

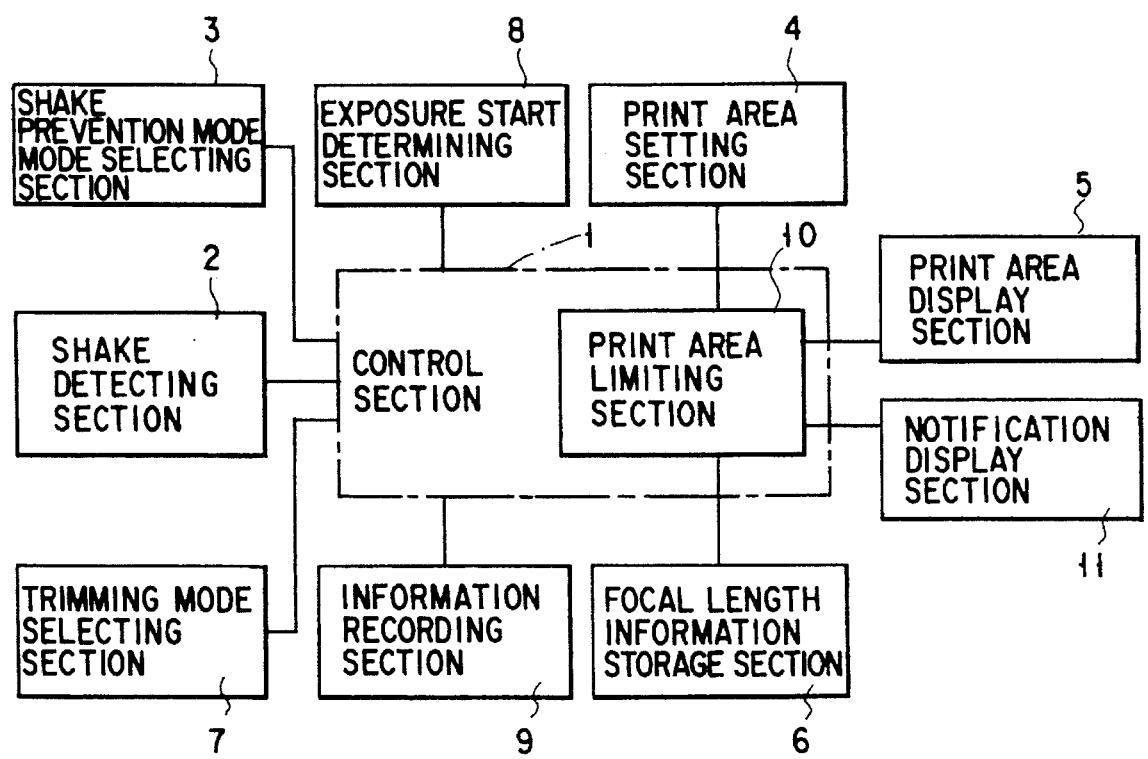
F I G. 3

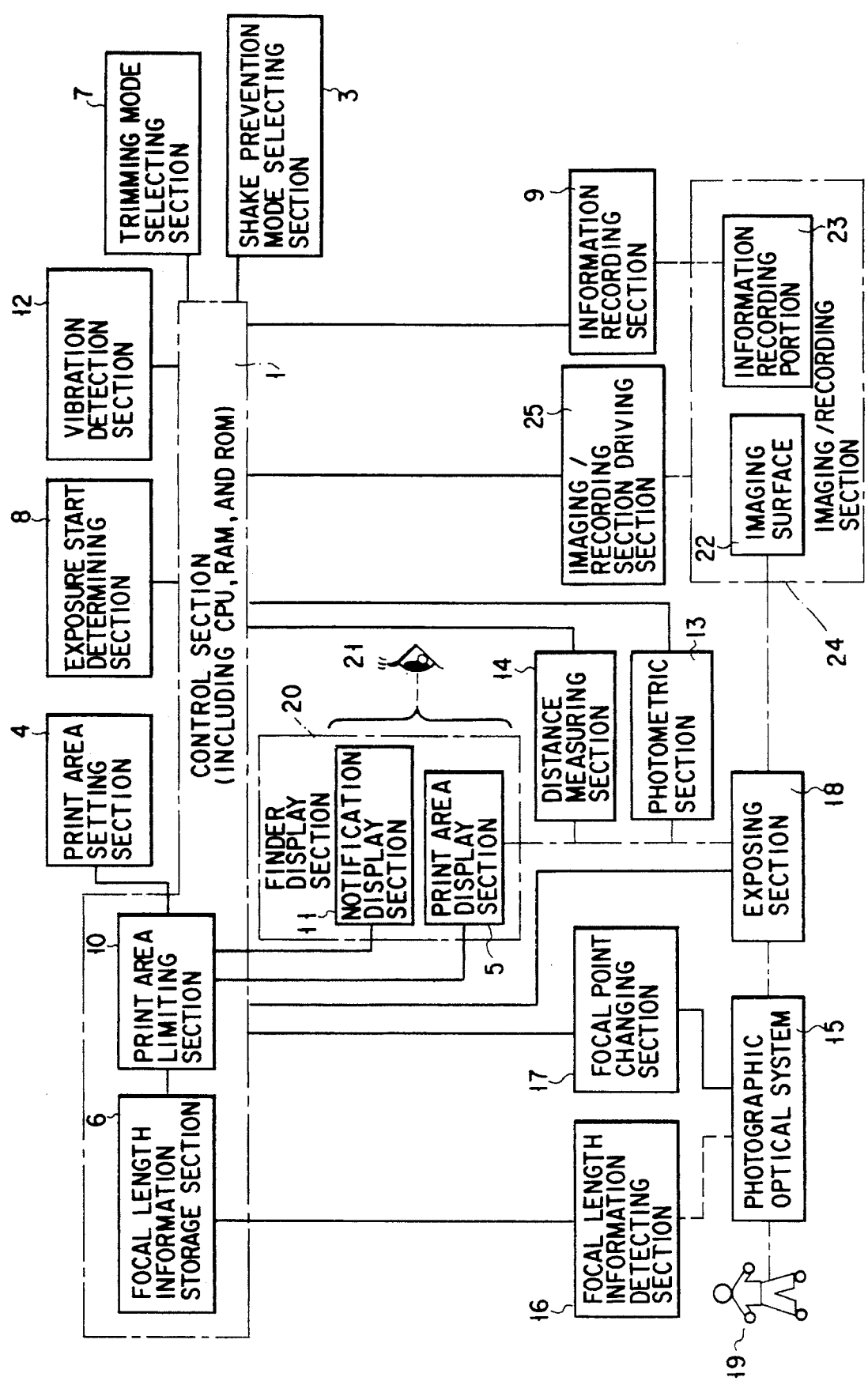
F I G. 4

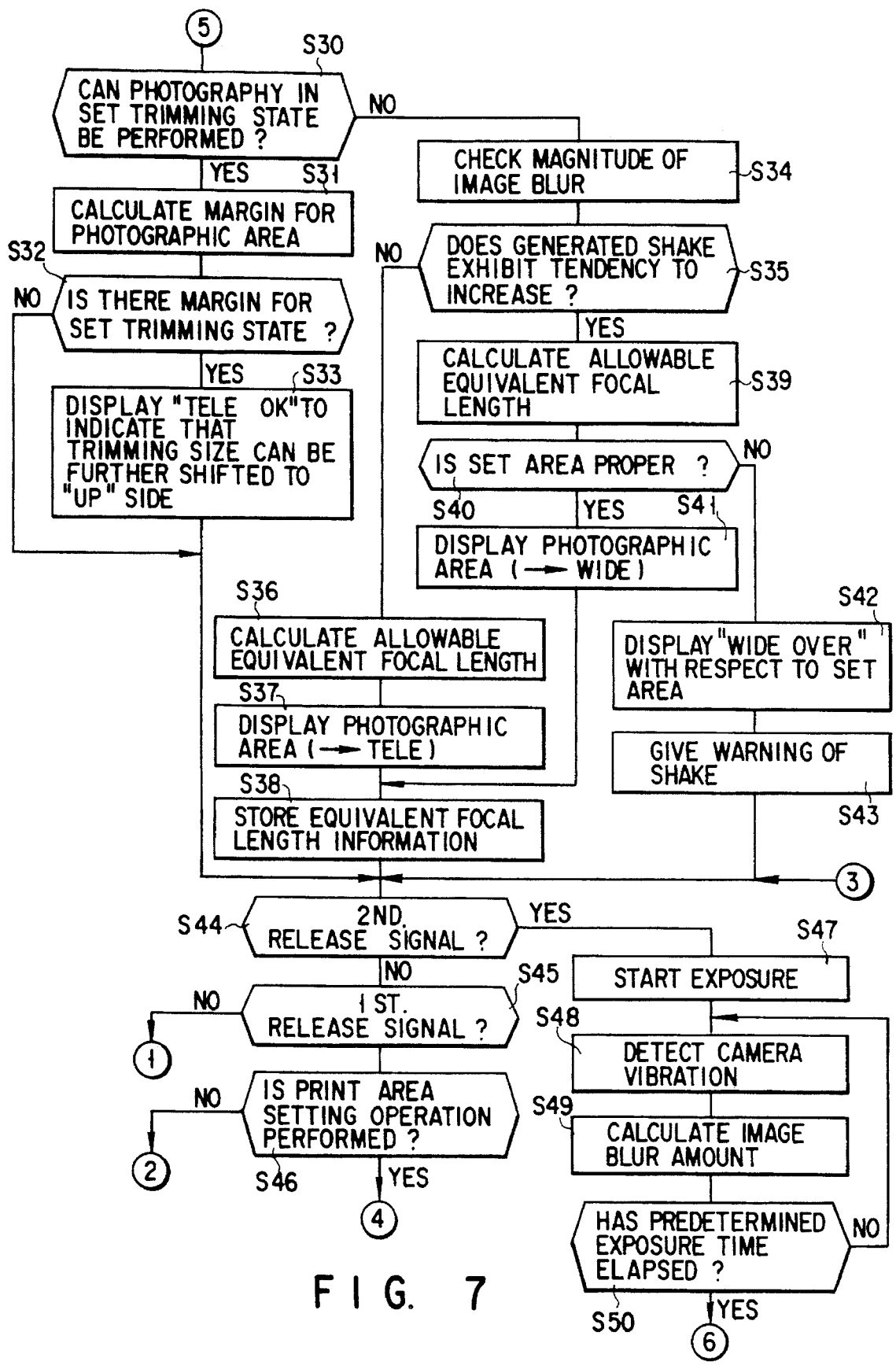
F I G. 7

500 16

250 11

PRINT AREA FRAME
(TO BE CHANGED IN STEPLESS
MANNER IN ACCORDANCE WITH
SETTING)

(TELE OVER)    125  5.6
NOTIFICATION DISPLAY SECTION

TELE          250  16
OK

PRINT AREA SET BY PHOTOGRAPHER

IN CASE OF SHAKE EXHIBITING TENDENCY TO DECREASE

IN CASE OF SHAKE EXHIBITING TENDENCY TO INCREASE

PRINT AREA SET BY PHOTOGRAPHER (ON)

PRINT AREA, IN WHICH INFLUENCE OF SHAKE IS NOT NOTICEABLE, SET ON CAMERA SIDE ON THE BASIS OF SHAKE DURING EXPOSURE (FLICKERED)

CAMERA HAVING HAND SHAKE DETECTING FUNCTION AND TRIMMING MODE SELECTING FUNCTION

BACKGROUND OF THE INVENTION

1. Field of the Invention

The present invention generally relates to a camera and, more particularly, to a camera having a trimming mode selecting function of designating a range narrower than a normal photographic range as a print range, and a hand shake detecting function.

2. Description of the Related Art

Cameras having various types of hand shake preventing means have been proposed. For example, some cameras are designed to generate a warning or stop a photographic operation when a hand shake is likely to occur. In addition, some other cameras are designed to vibrate a photographic optical system in a direction to reduce a shake in order to actively decrease the magnitude of the shake.

In general, when a negative film which has undergone a photographic operation is subjected to a printing/enlarging process by means of trimming, a pseudo-telephoto effects can be obtained with this process, a small image on a negative film can be enlarged and seen as a large image. Therefore, a camera capable of designating a trimming size in a printing/enlarging process or a photographic system capable of handling optical information such as trimming information other than photographic information equivalently has a high-magnification zoom lens, even if it is a single-focus camera, which is a great merit.

For this reason, the following techniques have been developed.

For example, U.S. Pat. No. 4,774,536 discloses a camera which determines an equivalent focal length from a trimming size determined upon a trimming size designating operation, and determines a hand shake shutter speed limit on the basis of this information, thereby obtaining a shutter speed limit in a trimming photographic operation.

In addition, U.S. Pat. No. 4,780,735 discloses a technique of shifting the aperture state from the full-aperture state toward the stopped-down-aperture state and increasing the shutter speed in accordance with a designated trimming level, thereby preventing a photographic operation resulting in an image blur and an out-of-focus state.

Furthermore, U.S. Pat. No. 4,780,735 discloses a technique of detecting ISO film speed information and posing some limitations on the determination of a trimming size, thereby preventing an excessive deterioration in the image quality of a print obtained by a photographic operation using a high-speed film.

Moreover, Jpn. Pat. Appln. KOKAI Publication No. 64-55544 discloses a technique of determining whether a given trimming size falls within the interlocking range of an automatic focusing unit and also determining whether setting of a trimming size on the basis of object brightness information is permitted (setting of a trimming size is not permitted in an out-of-focus state regardless of brightness information).

If, however, a hand shake preventing means is operated, the release time lag or the power consumption is increased, or a warning display and the like in combination with other warning displays are complicated and difficult to recognize. For this reason, it is preferable that the hand shake means be operated only when it is required. However, in a camera to which the above-mentioned trimming mode selecting function is added, it is difficult and cumbersome for ordinary users, except for some skilled users, to select an operation or non-operation mode.

In addition, a user may feel as if the image quality of a print greatly deteriorates, depending on a trimming size in a printing/enlarging process. Furthermore, when an image on a negative film is enlarged by a trimming process, an image blur, an out-of-focus state, and the like on the negative film are also enlarged. Consequently, the resulting photograph may not be as beautiful as the photographer thought.

The following problems are posed in the above-described trimming cameras.

For example, in the camera disclosed in U.S. Pat. No. 4,774,536, since the shutter speed is increased regardless of the state of an actual shake, the shutter speed is unnecessarily increased even if no shake is caused. For this reason, the resulting photograph may have a small depth of field, or an electronic flash may unnecessarily emit flashlight.

In addition, in the camera disclosed in U.S. Pat. No. 4,780,735, since the aperture value and the shutter speed are changed in accordance with a trimming level, exposure conditions are undesirably limited regardless of the presence/absence of an image blur and an out-of-focus state.

Furthermore, in the camera disclosed in U.S. Pat. No. 4,780,735, although no problems are posed in the use of a high-speed film, no specific limitations are set in the use of a generally used low-speed film, disregarding actual photographic conditions.

Moreover, in the camera disclosed in Jpn. Pat. Appln. KOKAI Publication No. 64-55544, the determination of permission/prohibition of a trimming photographic operation is performed simply on the basis of object brightness information, regardless of a trimming size, so that the determination varies in an actual operation with a slight brightness change. Such an unnatural operation will confuse the photographer.

SUMMARY OF THE INVENTION

It is, therefore, an object of the present invention to provide a new and improved camera having a trimming mode selecting function of designating a range narrower than a normal photographic range as a print range, and a hand shake detecting function, in which a deterioration in image quality due to a hand shake can be easily prevented.

It is another object of the present invention to provide a camera capable of designating a trimming size to designate a range narrower than a normal photographic range as a print range, in which a proper trimming size is determined on the basis of the state of a trimming photographic area, and the trimming size is controlled and notified to a photographer, thereby allowing a proper photographic operation.

According to one aspect of the present invention, there is provided a trimming camera which designates a print range narrower than a normal photographic frame and records the print range, comprising: print area setting means for manually setting the print range; focal length detecting means for detecting a focal length of the trimming camera; equivalent focal length calculating means for calculating an equivalent focal length on the basis of the focal length of the trimming camera, detected by the focal length detecting means, and the print range set by the print area setting means; shake detecting means for detecting a value associated with a shake amount of the trimming camera; image blur calculating means for calculating an image blur amount at the equivalent focal length on the basis of the equivalent focal length calculated by the equivalent focal length calculating means and the value associated with the shake amount, detected by the shake amount detecting means; determining means for determining whether the image blur amount calculated by the image blur amount calculation means falls within a predetermined range; limiting means for limiting the print range set by the print area setting means when the determining means determines that the set print range falls outside the predetermined range; and display means for displaying the print range limited by the limiting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram of a camera having a hand shake detecting device according to the first embodiment of the present invention, showing a concept of the present invention;

FIG. 2 is a block diagram showing another concept of the present invention;

FIG. 3 is a block diagram showing still another concept of the present invention;

FIG. 4 is a block diagram showing the arrangement of a single-lens reflex camera to which the camera having the hand shake detecting device according to the present invention is applied;

FIG. 7 is a flow chart for explaining an operation of the camera in FIG. 4;

DETAILED DESCRIPTION OF THE PREFERRED EMBODIMENTS

Figure 5A:
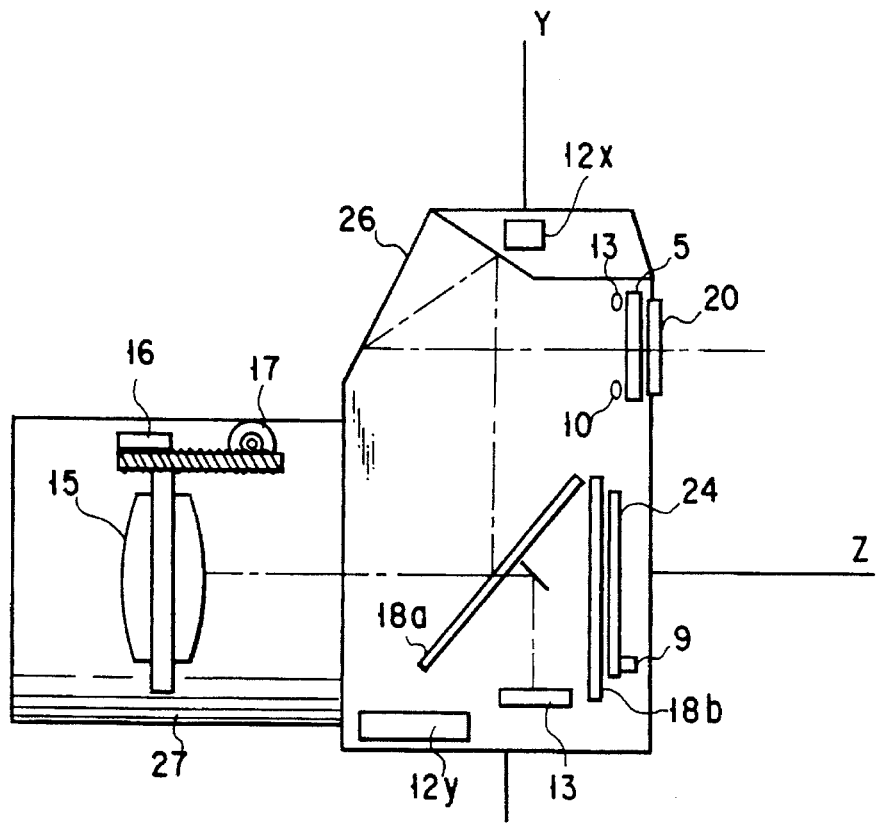
FIGS. 5A and 5B are side and plan views showing the outer appearance of the camera in FIG. 4.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

FIG. 1 is a block diagram of a camera having a hand shake detecting device according to the first embodiment of the present invention, showing a concept of the present invention. Referring to FIG. 1, the following components are connected to a control section 1 constituted by a CPU, a RAM, a ROM, and the like: a shake detecting section 2 for detecting a shake, a shake prevention mode selecting section 3 for selecting a shake prevention mode (to be described later), a print area setting section 4 for setting a print area in a trimming photographic operation, a print area display section 5 for displaying the print area, set by the print area setting section 4, in the finder of the camera, a focal length information storage section 6 for storing the focal length information of a photographic lens, and a trimming mode selecting section 7 for selecting a trimming mode.

In the camera having the hand shake detecting device with the above-described arrangement, a print area is set first by a photographer using the print area setting section 4. The control section 1 then detects the state of a shake through the shake detecting section 2, and determines, on the basis of this information and current focal length information from the focal length information storage section 6, whether the set print area in a trimming photographic operation is proper and how wide the proper area is. With this operation, a trimming area which suppresses a deterioration in the image quality of a print can be selected in accordance with the magnitude of a shake.

When the trimming mode is selected through the trimming mode selecting section 7, the control section 1 automatically selects the shake prevention mode in synchronism with the switching operation. The shake prevention mode is selected or not selected through the shake prevention mode selecting section 3.

FIG. 2 is a block diagram showing another concept of the present invention. In order to avoid a repetitive description in the following description, the same reference numerals in FIG. 2 denote the same parts as in FIG. 1, and a description thereof will be omitted, with only a different portion being described.

Referring to FIG. 2, reference numeral 8 denotes an exposure start determining section 8 for determining the timing of starting an exposure operation of the camera. A release button or the like provided to a camera body 26 in FIG. 5B and denoted by the same reference numeral is equivalent to the exposure start determining section 8. An information recording section 9 is used to optically or magnetically record trimming information, determined and controlled by the control section 1, on an information recording portion additionally formed on an imaging/recording portion such as a film.

As described above, the trimming information determined by the control section 1 changes in accordance with the state of a printer area detected by the shake detecting section 2. In this case, however, when an exposure operation (photography) is started by the exposure start determining section 8, and the state of the print area further changes during the exposure operation, the trimming information is written in the information recording portion added to the imaging/recording portion such as a film in consideration of this change.

FIG. 3 is a block diagram showing still another concept of the present invention. Only the differences between the arrangement shown in FIG. 3 and the arrangements shown in FIGS. 1 and 2 will be described. A control section 1 incorporates a print area limiting section 10. The print area limiting section 10 systematically makes a decision on the print area set by a print area setting section 4 on the basis of focal length information of the photographic lens as well as information indicating the print area state detected by a shake detecting section 2. The determined print area is displayed on a print area display section 5, and the other information is displayed and notified by a notification display section 11, as described above.

Consider a case wherein the camera having the hand shake detecting device of the present invention is applied to a single-lens reflex camera.

Figure 5B:
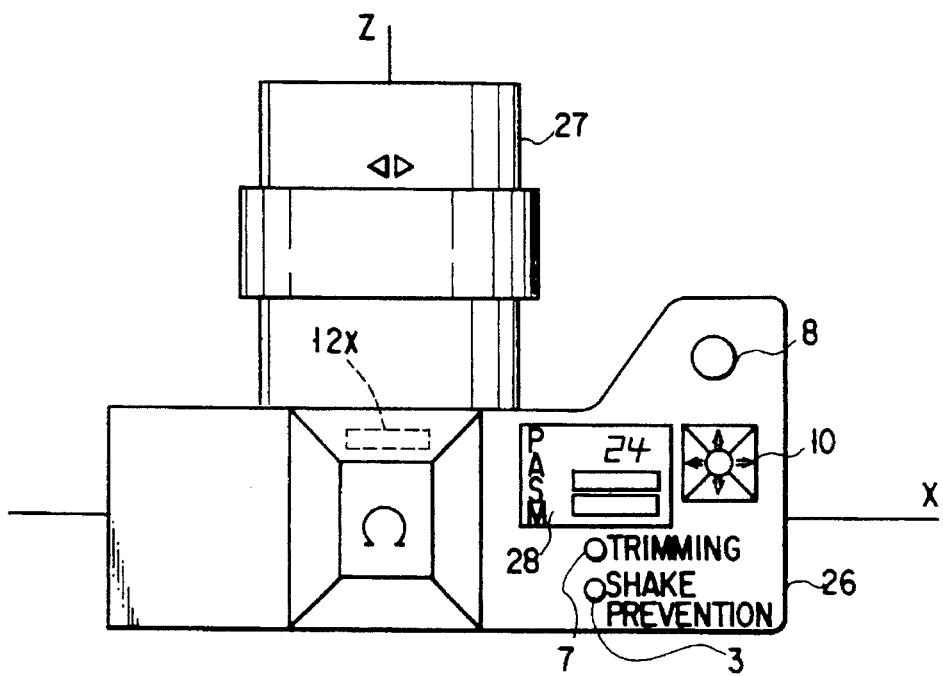

FIG. 4 is a block diagram showing the arrangement of a single-lens reflex camera to which the camera having the hand shake detecting device of the present invention is applied. FIGS. 5A and 5B are side and plan views showing the outer appearance of the camera.

Referring to FIG. 4, a vibration detecting section 12 is equivalent to the above-described shake detecting section 2, and more specifically a sensor for detecting the mechanical vibration of the camera. For example, the vibration detecting section 12 may be constituted by angular velocity sensors. In order to detect the movement of the camera body around the X- and Y-axes as rotational centers, angular velocity sensors 12x and 12y constituting the vibration detecting section 12 are arranged in the manner shown in FIGS. 5A and 5B. A detection output from the vibration detecting section 12 is supplied to the control section 1 to be used to determine whether a trimming size is proper or not.

A photometric section 13 and a distance measuring section 14 are connected to the control section 1. The photometric section 13 measures a brightness state in the photographic area of the camera. The distance measuring section 14 detects object distance information in a photographic operation. In addition, a focal length information detecting section 16 and a focal point changing section 17 are connected to the control section 1. The focal length information detecting section 16 detects the focal length information of a photographic optical system 15. The focal point changing section 17 drives the photographic optical system 15 to achieve an in-focus state upon detection of the object distance information from the distance measuring section 14. The focal length information detected by the focal length information detecting section 16 is supplied to the focal length information storage section 6 of the control section 1. Although FIG. 4 shows the focal length information storage section 6 incorporated in the control section 1, the section 6 may be separately arranged.

As shown in FIG. 5A, an exposing section 18 is constituted by a quick return mirror 18a, a shutter curtain driving unit 18b, and the like. The exposing section 18 is used for an exposure operation in response to a command from the exposure start determining section 8. Note that the alternate long and short dashed lines in FIGS. 4 and 5A indicate optical paths. More specifically, an object 19 to be photographed is displayed on a finder display section 20 including the print area display section 5 and the notification display section 11 described above through the exposing section 18 so as to be presented to a photographer 21 during operations except for an exposure operation. During an exposure operation, an image of the object 19 is projected onto an imaging/recording section 24 having an imaging surface 22 and an information recording portion 23.

As the print area display section 5, for example, a generally known liquid crystal display unit or the like may be used. As described above, the information recording section 9 is arranged to optically or magnetically record photographic information such as trimming information on the information recording portion 23 of the imaging/recording section 24. This recording of information such as trimming information is performed in synchronism with a film wind-up or rewind operation of the imaging/recording section 24. This film-up/rewind operation is performed by an imaging/recording section driving section 25.

Referring to FIGS. 5A and 5B, reference numeral 26 denotes a camera body; and 27, a photographic lens. Every time the trimming mode selecting section (selection button) 7 is depressed while the power switch is turned on by a means (not shown), the display "TRIMMING" on a liquid crystal display unit 28 is turned on or off, thus indicating whether the trimming mode is selected or not.

In the present invention, when the trimming mode is selected through the trimming mode selecting section 7, the shake prevention mode is automatically selected in synchronism with this switching operation, thus turning on the display "SHAKE PREVENTION" on the liquid crystal display unit 28. In this case, if the photographer wants to change/cancel the shake prevention mode for some reason, he/she depresses the shake prevention mode selecting button 3, thus manually switching between a selected state or a non-selected state of the shake prevention mode.

As the print area setting section 4 for setting a frame area used for printing in the trimming mode, a known joystick may be used. Alternatively, an UP-DOWN key for setting a shutter speed, an aperture value, or the like, a TELE-WIDE switch of a zoom lens, or the like may also serve as the print area setting section 4.

Although the above-described arrangement exemplifies a single-lens reflex camera, basically the same arrangement can be applied to a lens shutter camera. However, in a lens shutter camera, for example, the photographic optical system 15 may be constituted by a single-focus lens, and the print area display section 5 may be constituted by a zoom finder, as a finder optical system, which can properly respond to a set trimming operation. In addition, the print area display section 5 may serve as both the above-mentioned zoom finder optical system and a liquid crystal display means.

A trimming size limiting operation as a means for suppressing the influence of a shake and preventing a shake will be described in detail below with reference to the flow charts shown in FIGS. 6 to 8, the finder display samples shown in FIGS. 9A to 9G, and the graph shown in FIG. 10 indicating the correspondence between an image blur state in a trimming area and a finder display.

Figure 6:
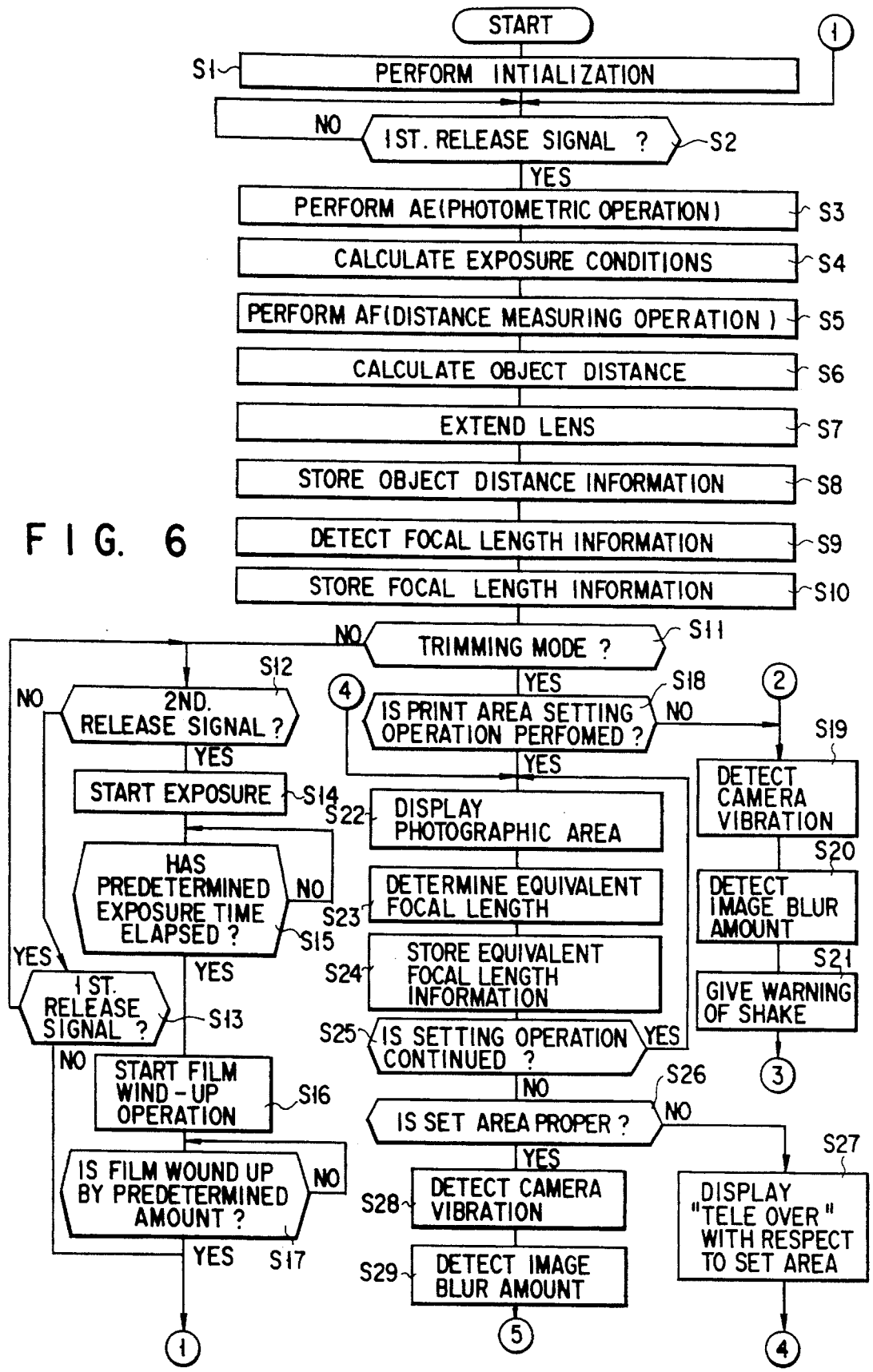
FIG. 6 is a flow chart for explaining an operation of the camera in FIG. 4.

In step S1 in FIG. 6, initialization is performed. In step S2, it is checked whether a first (1st.) release signal for the camera is input. The 1st. release signal corresponds to a half-depressed state of the exposure start determining section 8. If NO in step S2, step S2 is repeated until the 1st. release signal is input.

If the 1st. release signal is input, the flow advances to step S3 to perform a photometric operation. In this operation, the photometric section 13 detects brightness information. In step S4, the brightness information is loaded into the control section 1, and exposure conditions (a shutter speed and an aperture value) are determined by the control section 1 on the basis of the brightness information and the ISO film speed detected by a film speed detecting means (not shown).

In step S6, a distance measuring operation is performed. In this operation, the distance measuring section 14 detects a signal associated with an object distance. This signal is loaded into the control section 1. In step S7, the object distance is calculated and determined. In step S8, the photographic optical system 15 is driven by the focal point changing section 17 to set the photographic system in an in-focus state on the basis of the determined object distance. In step S9, the object distance information is stored in an internal storage unit (RAM) (not shown) in the control section 1. In step S10, focal length information f of the photographic optical system 15 is detected by the focal length information detecting section 16. This focal length information f is stored in the control section 1, similar to the object distance information.

In step S11, it is checked whether the trimming mode is selected. If YES in step S11, the flow advances to step S18. If NO in step S11, the flow advances to step S12 to perform a normal photographic operation.

In step S18, it is checked whether a print area in a trimming operation is set. In this step, the operation state of the print area setting section 4 is checked. If no operation is performed, i.e., a trimming operation is not designated, the flow advances to step S19. If it is determined in step S18 that a print area in a trimming operation is set, the flow advances to step S22 to display the print area corresponding to the area setting operation with a frame. This display operation is performed by the print area display section 5.

Figure 9A:
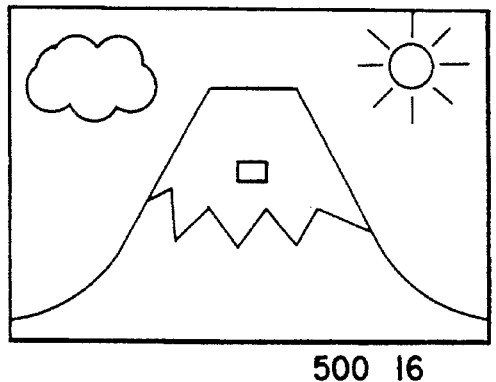
FIGS. 9A to 9G are views respectively showing display samples in the finder of the camera in FIG. 4.
Figure 9B:
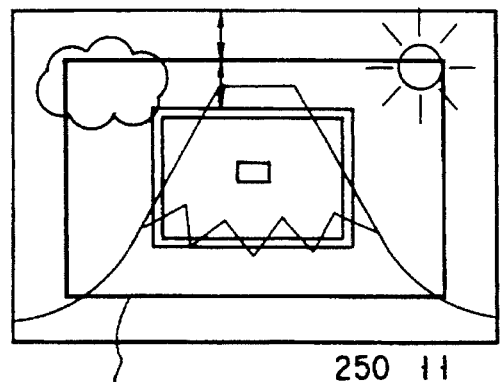

FIG. 9B shows an example of this display. Basically, this print area frame can be changed in a stepless manner in accordance with a setting operation of the print area setting section 4. In step S23, an equivalent focal length (to be referred to as an equivalent focal length ft hereinafter) corresponding to the set print area is calculated by the following equation:

$$ft = f \times \alpha$$

where $\alpha$ is the ratio of the normal print area to the set print area, i.e., the magnification in a printing operation. In step S24, this equivalent focal length ft is stored in the control section 1. In step S25, it is checked whether the print area setting operation is continuously performed by the print area setting section 4. If YES in step S25, the flow returns to step S22 to repeat the loop of steps S22 to S25 described above.

Figure 9C:
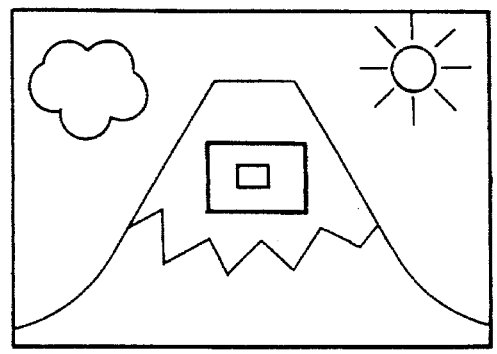

Subsequently, the flow advances to step S26 to check whether the set print area is proper. This decision step is performed by comparing a predetermined ratio $\alpha 0$ with the above-mentioned ratio $\alpha$ of the normal print area to the set print area. When $\alpha < \alpha 0$, the set print area is determined as a proper area. This operation is performed to impose a predetermined limitation on the size of a print area to be set for the following reason. If a print area is set to be excessively narrow, the magnification in a printing/enlarging operation is increased too much, and the particles on the obtained photograph become noticeable, resulting in a deterioration in image quality. This decision step is performed by the print area limiting section 10. If it is determined that the set print area is not proper for the above-described reason, the flow advances to step S27. In this step, the notification display section 11 notifies that the set print area is not proper. FIG. 9C shows an example of this display ("TELE-OVER"). Thereafter, the flow returns to step S13 to wait for a print area setting operation again.

In the description of the flow chart in FIG. 6, a series of operations, from the determination of whether a print area in a trimming operation is set to the determination of whether the set area is proper, are performed in step S18 and steps S22 to S26. However, the camera of the present invention is not limited to this. For example, the display and determining operations in step S18 and steps S22 to S26 may be performed before step S2 in which it is checked whether the 1st. release signal is input.

If it is determined in step S26 that the set print area is proper, the flow advances to step S28. In this step, a camera vibration amount is detected by the above-described shake detecting section 2, and specifically the vibration detecting section 12. Subsequently, in step S29, an image blur amount based on this vibration is calculated.

Steps S28 and S29 will be described in detail below. Assume that in FIGS. 5A and 5B, the camera body 26 and the photographic lens 27 vibrate (shake) about the X-axis as the rotational center. In this case, this vibration (shake) has an influence on the imaging surface in the imaging/recording section 24 in the Y-axis direction. Letting the image moving amount based on vibration about the Y-axis be $\Delta Y$, the moving amount $\Delta Y$ can be obtained by equation (1):

$$\Delta Y \ (\mu m) = ft \ast (1+\beta)^2 \ast \tan\theta x \tag{1}$$

for $\beta = f/l$
where ft is the equivalent focal length (mm), $\beta$ is the photographic magnification, f is the focal length (mm), l is the object distance (mm), and $\theta x$ is the angular displacement amount (rad) based on the vibration of the camera.

As these parameters, the values stored in steps S8, S10, and S24 are used, respectively. Note that if the vibration detecting section 12 is an angular sensor, the angular displacement amount $\theta x$ can be obtained by integrating these parameters. In addition, a moving amount $\Delta X$ can be calculated in the same manner. Equation (1) may be approximated to equation (2) without causing almost no problem:

$$\Delta Y \ (\mu m) = ft \ast \theta x \tag{2}$$

with this operation, the image blur amount at the equivalent focal length corresponding to the set print area in a trimming photographic operation can be calculated. Letting the sum of the image blur amount obtained by synthesizing the image blur amount $\Delta X$ in the x-axis direction and the image blur amount $\Delta Y$ in the Y-axis direction be $\Delta H$, equation (3) can be established:

$$\Delta = \sqrt{\Delta x^2 + \Delta y^2} \tag{3}$$

If it is determined in step S18 that no print area in a trimming operation is set, the flow advances to step S19. In steps S19 and S20, the same operations as those in steps: S28 and S29 described above are performed. Note that in step S20, since no print area is set, an image blur amount is calculated by using the focal length f instead of the equivalent focal length ft. The flow then advances to step S21 to warn a camera shake. Thereafter, the flow advances to step S44 (to be described later).

When the image blur amount is calculated in step S29, it is checked in step S30 FIG. 7 whether photography in the set print area can be performed. More specifically, it is checked whether the image blur amount calculated from the equivalent focal length information determined on the basis of the set print area is noticeable in an actual trimming printing operation. As an example of this decision, the image blur amount $\Delta Y$ calculated in step S29 is compared with a predetermined value $\gamma$. When $\Delta Y < \gamma$, it is determined that the image blur is not noticeable. For example, the predetermined value $\gamma$ is set to be about 50 μm. If it is determined that the image blur is noticeable, the flow advances to step S34. If it is determined in step S30 that photography in the set print area can be performed, the flow advances to step S31 to calculate a margin for the set print area.

This calculation will be described with reference to equation (2) as an example. If, for example, the value $\Delta Y$ of equation (2) is set to be 50 μm, since the value $\theta x$ is known, the value ft can be inversely calculated. Let the inversely calculated value ft be ft'. If ft'>ft (ft: the equivalent focal length information determined in step S23), it is determined that there is a margin for the set print area. This decision is performed in step S32. If it is determined in step S32 that there is a margin, the flow advances step S33.

Figure 9D:
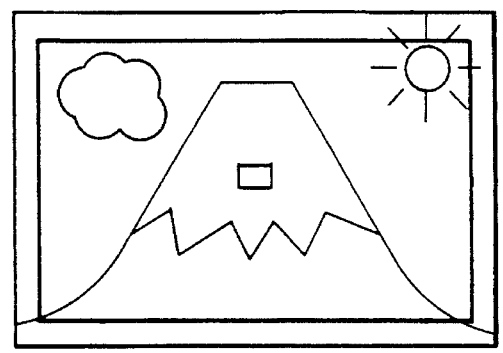

In step S33, a display which indicates that the set print area can be set on the "TELE" side is performed in the form shown in FIG. 9D. The flow then advances to step S44. If it is determined in step S32 that there is no margin for the set print area, the flow also advances to step S44.

An operation to be performed when it is determined in step S30 that photography in the set print area is not allowed will be described next. First, it is checked in step S34 whether the generated shake exhibits a tendency to increase or decrease. If it is determined in step S35 that the generated shake exhibits a tendency to decrease, the flow advances to step S36. Otherwise, the flow advances to step S39.

Consider first a case wherein the generated shake exhibits a tendency to increase when the generated shake exhibits a tendency to increase, the influence of the shake in a trimming operation becomes noticeable with the currently set print area. According to an embodiment of the present invention, the set print area is changed to an area in which the influence of the shake is not noticeable.

In step S39, an equivalent focal length corresponding to the print area in which the shake is not noticeable is calculated by using the current image blur obtained in step S34. In this step, similar to step S31 described above, if, for example, an allowable image blur amount is $\Delta Y = 50$ μm, since the value $\theta x$ is known (i.e., the generated shake obtained in step S34), the value ft can be inversely calculated by using $ft = \Delta Y / \theta x$ according to equation (2). Let ft calculated in this step be ft" (ft">ft"). It is then checked in step S40 whether the allowable equivalent focal length information ft" determined in step S39 described above is proper or not. In this step, in addition to the determination of whether the currently generated shake is large and its influence is noticeable in a photographic operation in the set print area, it is determined whether the influence of the shake is noticeable even in a photographic operation, e.g., at the actual focal length of the photographic system upon increasing the set area. In this case, the print area is increased to make the influence of the shake less noticeable, it is also checked whether the print area set to make the influence of the shake less noticeable is apparently larger than the print area set by the photographer so as to conflict with the photographer's will. More specifically, letting the focal length limit on the "WIDE" side be fw, when ft">fw, it is determined that the area can be set.

If it is determined in step S40 that the allowable equivalent focal length ft" determined in step S39 is proper, the flow advances to step S41. In this step, the proper photographic area is displayed on the print area display section 5. More specifically, the print area frame shown in FIG. 9B is displayed in the direction to increase the area to be wider than the current area to make the shake unnoticeable. An example of this area is displayed in FIG. 9F (in this case, the display frame moved in the direction indicated by the outward arrow). The flow then advances to step S38 to store the equivalent focal length information corresponding to this display in place of the information stored in step S24. Thereafter, the flow advances to step S44.

Figure 9E:
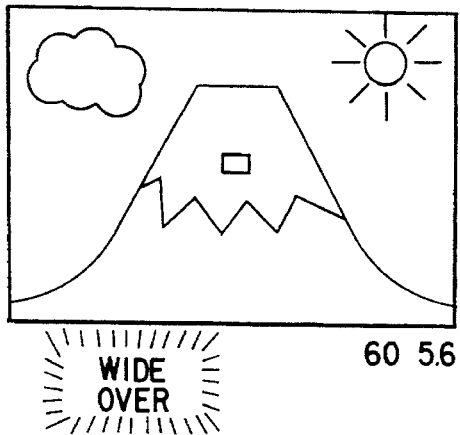

If it is determined in step S40 that the allowable equivalent focal length ft" determined in step S39 is not proper, the flow advances to step S42. In this case, as described above, since the currently generated shake is large, the influence of the shake is noticeable not only in the set print area but also in a wider area in which photographic operation is performed at, e.g., the actual focal length of the photographic system. For this reason, "WIDE OVER" is displayed in steps S42 and S43 to notify the photographer that it is difficult to properly perform a trimming photographic operation not only in the print area set by the photographer but also in a wider area. By flickering this display, it is notified that a large shake is generated. The flow then advances to step S44. FIG. 9E shows a display sample in this case.

A case wherein it is determined in step S35 that the generated shake exhibits a tendency to decrease will be described next. When the shake exhibits a tendency to decrease, the influence of the shake becomes noticeable in a trimming operation in the print area set by the photographer. It is, therefore, preferable that printing is performed in an area wider than the set area. However, since the shake exhibits a tendency to decrease, a print area is set to be as closer to the print area set by the photographer as possible.

That is, in step S36, an equivalent focal length corresponding to a print area large enough to make the shake unnoticeable is calculated. Similar to the description of steps S31 and S39, when equation (2) is modified, since the value $\theta x$ is known (i.e., the state of the generated shake), the value ft can be inversely calculated, provided that the value $\Delta Y$ (μm) is set to be, e.g., 50 μm. Let the inversely calculated value ft be ft' (ft>ft').

Figure 9F:
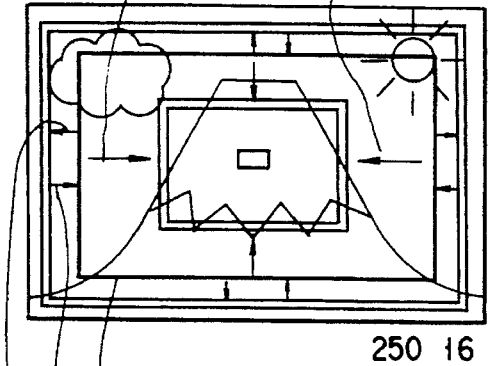

Subsequently, in step S37, the print area display section 5 displays a proper photographic area on the basis of the allowable equivalent focal length ft' determined in step S36. More specifically, the print area frame shown in FIG. 9B is displayed in the direction in which the print area is closer to the print area initially set by the photographer. FIG. 9F shows a display sample in this case (although the display frame moves in the direction indicated by the inward arrow, the frame does not move inside the print area set by the photographer). The flow then advances to step S38 to store the equivalent focal length information corresponding to this display in place of the information stored in step S24. Thereafter, the flow advances to step S44.

In step S44, it is checked whether a second (2nd.) release signal for the camera is input. This 2nd. release signal corresponds to a fully depressed state of the exposure start determining section 8. If the 2nd. release signal is not input, the flow advances to step S34. Otherwise, the flow advances to step S45.

In step S45, it is checked whether the 1st. release signal is also input. If NO in step S45, the flow returns to step S2 to wait for input of the 1st. release signal. If it is determined in step S45 that the 1st. release signal is input, the flow advances to step S46 to check whether a print area setting operation has been performed so far. If YES in step S46, the flow returns to step S22 in FIG. 6 to set another print area and detect a shake. If NO in step S46, the flow returns to step S19 in FIG. 6.

If it is determined in step S44 that the 2nd. release signal is input, the flow advances to step S47 to start an exposure operation. In steps S48 and S49, detection of vibration of the camera and calculation of an image blur amount are performed in the manner described above. In step S50, it is checked whether a predetermined exposure time has elapsed. If YES in step S50, the flow advances to step S51 to check whether the photographic area in the exposure operation was proper. This step is performed to check on the basis of the state of a shake whether printing with the trimming Size set by the photographer before the exposure operation is proper. If it is determined that a shake whose influence becomes noticeable in a printing operation is not generated during exposure, the flow advances to step S57.

If it is determined in step S51 that a shake whose influence becomes noticeable in a printing operation is generated during exposure, the flow advances to step S52 to calculate a proper print area. More specifically, a proper print area is calculated by the same method and decision step as those in steps S39 and S40 described above on the basis of the image blur amount detected and calculated in steps S48 and S49.

Figure 9G:
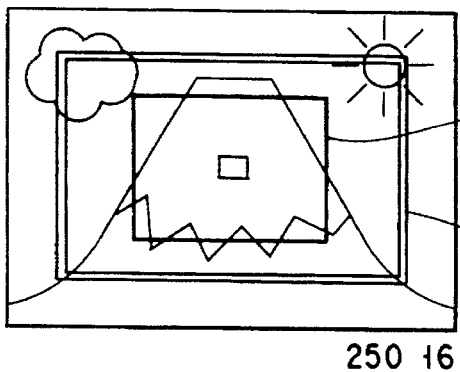

In step S53, it is checked whether the influence of the shake generated during exposure can be eliminated by widening the print area set by the photographer. If the shake generated during exposure is too large, the influence of the shake may be still noticeable even in a photographic operation at the actual focal length of the photographic system. In such a case, the flow advances to step S55. If it is determined in step S53 that the influence of the shake generated during exposure can be eliminated by widening the print area set by the photographer, the flow advances to step S54. In this step, the print area based on trimming information to be recorded on the information recording portion 23 of the imaging/recording section 24 is displayed on the print area display section 5. In step S56, trimming information to be actually recorded is set, and the flow advances to step S57. FIG. 9G shows a display sample displayed on the print area display section 5 in this case.

If it is determined in step S53 that the influence of the shake generated during exposure cannot be eliminated by widening the print area, the flow advances to step S55 to display this information by flickering "WIDE OVER", as shown in FIG. 9E. Thereafter, the flow advances to step S56. In step S56, a normal (no trimming) size or a predetermined trimming size (considerably larger than the trimming size set by the photographer) is set as trimming information.

In step S57, in order to record photographic information such as trimming information on the information recording portion 23 of the imaging/recording section 24, the information recording section 9 is set. The flow then advances to step S58, in which a wind-up operation of the film as the imaging/recording section 24 is started by the imaging/recording section driving section 25. In step S59, the above-mentioned information such as trimming information is recorded.

In step S60, it is checked whether the film is wound up by a predetermined amount. This step continues until the film is wound up by the predetermined amount. If YES in step S60, the film wind-up operation performed by the imaging/recording section driving section 25 is stopped. In step S62, the information recording section 9 is reset. In step S63, the displays of the print area frame as the print area information, "WIDE OVER", and the like on the print area display section 5 and the notification display section 11 are cleared.

In step S64, the equivalent focal length information stored in the control section 1 is cleared. The flow then returns to step S2 in FIG. 6.

With the above-described operations, a print area is set and displayed on the basis of trimming instructions, and a print area is controlled and limited in accordance with a generated shake so as to make the influence of the shake unnoticeable in a trimming/printing operation.

The relationship between an image blur state in each print area based on a trimming instruction and a corresponding display in the finder will be described next with reference to FIG. 10.

Figure 10:
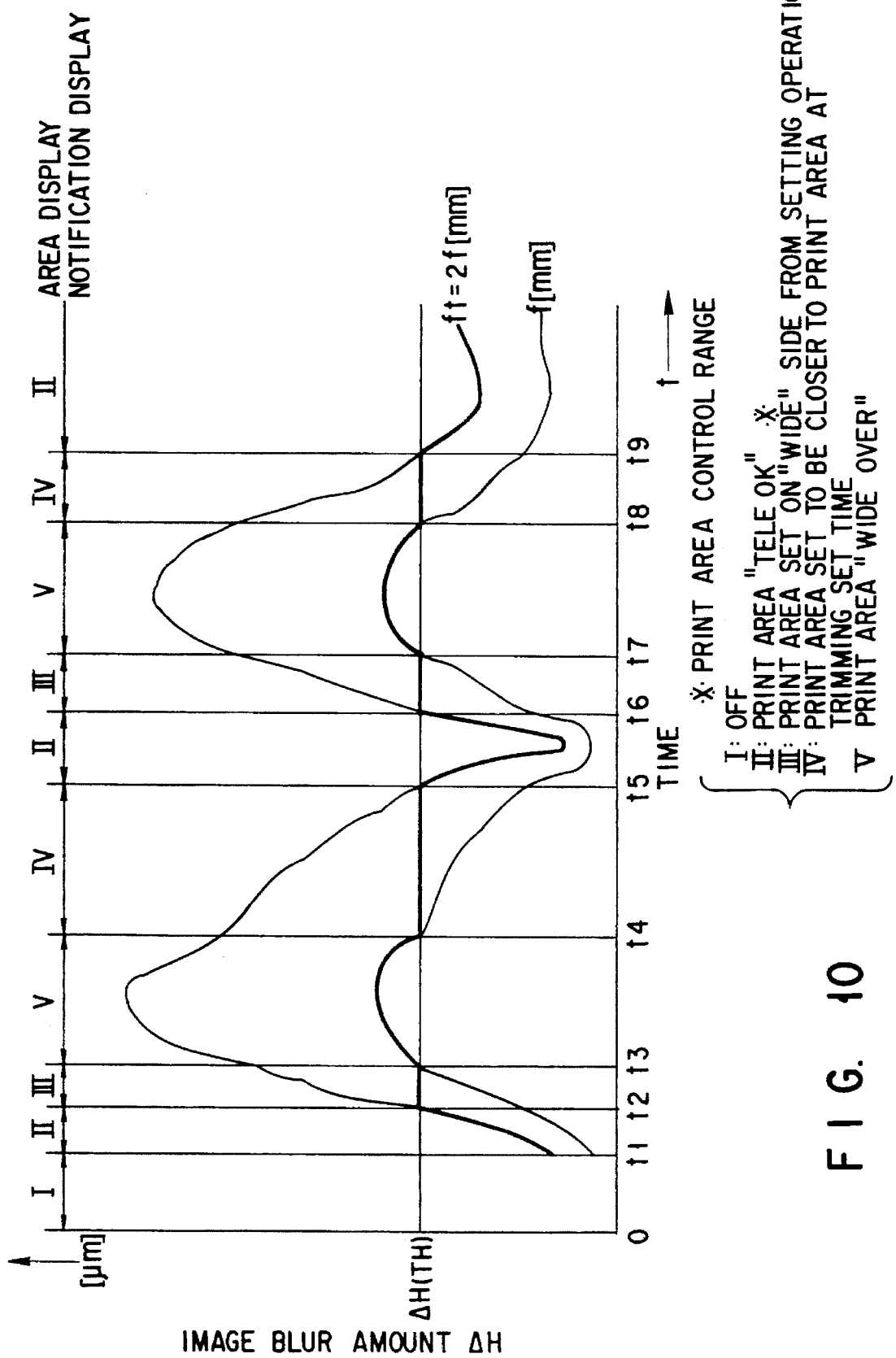
FIG. 10 is a graph showing the correspondence between an image blur state in a trimming area and a display in the finder.

FIG. 10 shows the trace of image blur with respect to time, in which the ordinate represents the above-mentioned image blur amount ΔH, and the abscissa represents the time axis. In the graph shown in FIG. 10, the actual focal length of the photographic system is represented by f (mm), and the equivalent focal length ft determined on the basis of the print area based on a trimming instruction is set as ft=2f (mm). That is, since the equivalent focal length ft is twice the actual focal length of the photographic system, it can also be considered that the image blur amount is almost twice that at the actual focal length.

This phenomenon will be described below with reference to the flow chart in FIG. 6. Assume that setting of a print area is performed with the equivalent focal length: ft=2f (mm) at a timing t1 in FIG. 10 (step S18). Since no setting operation is performed before this timing t1, the area notification display becomes a portion (OFF) indicated by "I" in FIG. 10. Although detection of a shake and calculation of an image blur amount from the timing t1 are performed, since the image blur amount ΔH is smaller than ΔH$_{(TH)}$ till a timing t2, a display II (print area "TELE OK") is performed. However, the image blur exceeds the value ΔH$_{(TH)}$ after the timing t2, and hence a display III is performed after the timing t2, and the print area at the trimming set timing changes toward the "WIDE" side.

In the interval between a timing t3 and a timing t4, since even the image amount calculated with the actual focal length f (mm) of the photographic system exceeds the value ΔH$_{(TH)}$, a display IV is performed, and the print area which has been changed toward the "WIDE" side to prevent image blur in the display III is changed toward the print area set at the trimming set time. At a timing t5, even the image blur amount calculated from the equivalent focal length: ft=2f (mm) in the print area set at the timing set time becomes smaller than the value ΔH$_{(TH)}$, a display II (print area "TELE OK") is performed. Subsequently, at timings t6, t7, t8, t9, . . . , displays are performed by similar decision processing.

The track indicated by the thick solid line in FIG. 10 represents the image blur amount on a film surface calculated in consideration of a printing operation (printing/enlarging operation) based on a trimming size instruction. Referring to FIG. 10, the traces of the image blur amounts in the display areas III and IV are constant at ΔH$_{(TH)}$. This is because the trimming size is changed in accordance with a change in shaken state of the camera to make the blur in a printing operation unnoticeable.

In the above description, the vibration detecting section 12 is used for the shake detecting section 2. In the following description, however, the photometric section 13 is used for the shake detecting section 2. Note that in order to avoid a repetitive description, only a portion different from the above description will be described hereinafter.

As the photometric section 13, a section obtained by arranging a plurality of photometric elements capable of performing a photometric operation with respect to an area equivalent to a film surface corresponding to a print area designated by the photographer through the print area setting section 4 is used. This photometric section 13 detects the brightness information associated with an area set by the print area setting section 4.

In this case, the following values are set:
a shutter speed determined on the basis of the brightness state of the set print area and the ISO film speed: SK (SEC); and a shutter speed based on the equivalent focal length ft calculated from the set print area: ST(ft) (SEC) (e.g., ST=1/ft).

The equivalent focal length ft is controlled as follows in accordance with the shutter speeds SK and ST:

(1) If SK<ST(ft), then the equivalent focal length ft is set on the "TELE" side, i.e., the shutter speed ST is increased.

(2) If SK=ST(ft), then the equivalent focal length ft is set to be constant.

(3) If SK>ST(ft), then the equivalent focal length ft is set on the "WIDE" side, i.e., the shutter speed ST is decreased.

Of the above-described statements, proposition (1) indicates that the print area can be further shifted to the UP ("TELE") side with respect to the set print area. In contrast to this, proposition (3) indicates that the print area is set in a range ("WIDE" side) wider than the set print area. According to proposition (2), the value ft with which SK=ST(ft) is determined as a print area. With this operation, a proper print area corresponding to the shutter speed determined on the basis of the brightness state of the set print area and the ISO film speed is determined.

A case wherein the photometric section 13 is used as the shake detecting section 2 will be described next with reference to the flow chart in FIG. 11.

Figure 11:
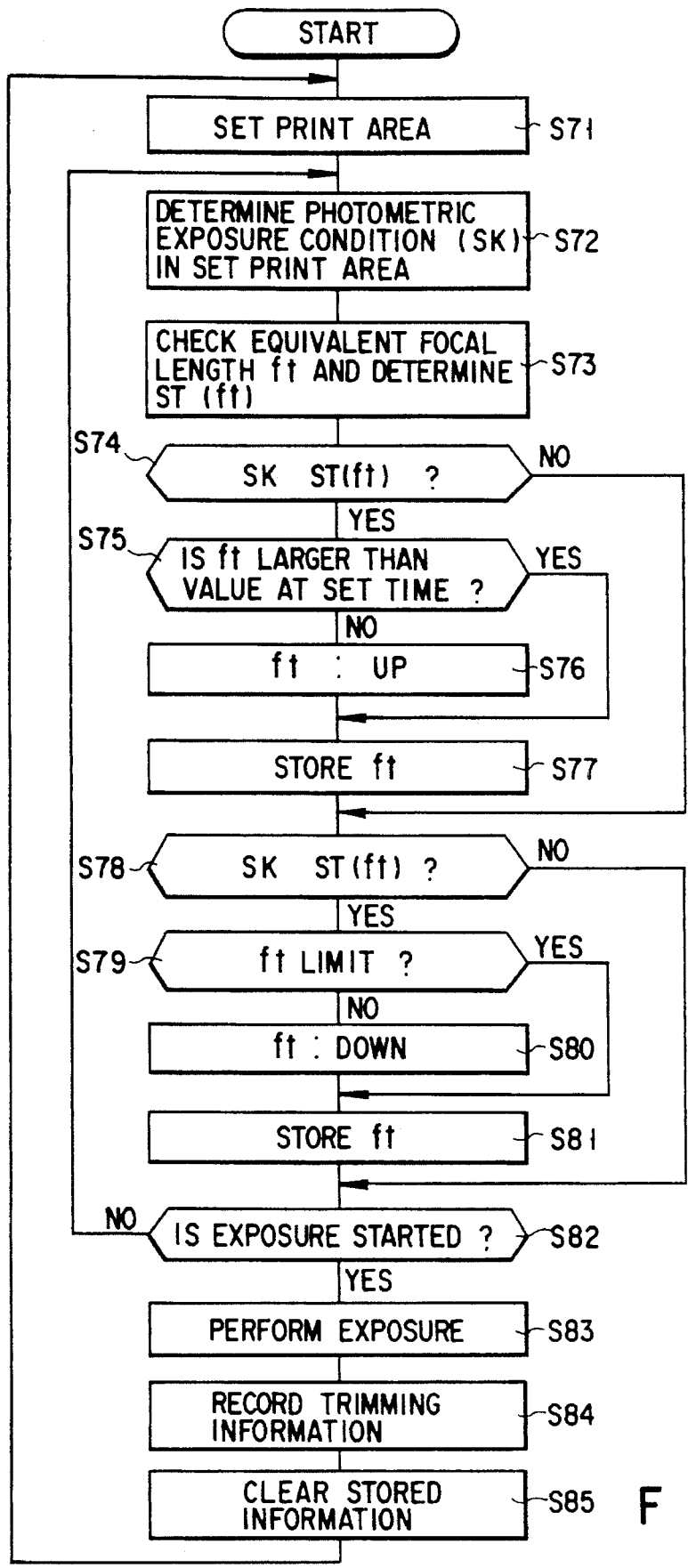
FIG. 11 is a flow chart for explaining an operation to be performed when a photometric section is used for a shake detecting section.

Referring to FIG. 11, in step S71 after "START", a print area is set by the print area setting section 4. In step S72, the brightness state of the print area set in step S71 is measured by the photometric section 13. A photographic condition (shutter speed: SK) is determined from this brightness information. In step S73, an equivalent focal length is obtained from the set print area information, and a shutter speed ST(ft) based on the obtained equivalent focal length is determined.

In step S74, the determination of proposition (1) is performed, that is, it is checked whether SK<ST(ft). If NO in step S74, the flow advances to step S78. If YES in step S74, the flow advances to step S75. In step S75, it is checked whether the equivalent focal length ft corresponding to the print area is larger than the equivalent focal length corresponding to the print area set by the photographer in step S71. If NO in step S75, the flow advances to step S76 to set the equivalent focal length on the UP side ("TELE" side). Accordingly, the display of the print area frame on the print area display section 5 is set in the direction to narrow the area.

If it is determined in step S75 that SK<ST(ft), the flow directly advances to step S77 to narrow the print area set by the photographer. In step S77, the information based on the print area previously set or changed is recorded as trimming information.

In step S78, the determination of statement (3) is performed, that is, it is checked whether SK>ST(ft). If NO in step S78, the flow advances to step S82. If YES in step S78, the flow advances to step S79. In step S79, it is checked whether the equivalent focal length ft corresponding to the print area exceeds the focal length f of the photographic optical system of the camera. If NO in step S79, the flow advances to step S80 to set the equivalent focal length on the DOWN side ("WIDE" side). Accordingly, the display of the print area frame on the print area display section 5 is set in the direction to widen the area.

If YES in step S79, it means that a range wider than the actual focal length f of the photographic optical system of the camera is to be photographed. In reality, however, it is impossible, and hence the flow advances to step S81. In step S81, the information based on the print area previously set or changed is recorded as trimming information, similar to step S77.

In step S82, it is checked whether an exposure start command is issued by the exposure start determining section 8 or the like. If NO in step S82, the flow returns to step S72 to repeat the above-described loop. If YES in step S82, the flow advances to step S83 to perform an exposure operation. Thereafter, while the film is wound up in step S84, the pieces of trimming information stored in steps S71, S77, S81, and the like are recorded. In step S85, the pieces of information are cleared. The flow then returns to step S71.

In the above-described flow charts, the shake prevention mode is automatically selected when the trimming mode, which is the main feature of the present invention, is selected. If, however, the shake prevention mode is canceled by a manual operation or the like even when the trimming mode is set, the same flow charts as those described above can be formed except for the determination and operations associated with a shake. That is, trimming and exposure are performed regardless of the magnitude of a shake. If the shake prevention mode is selected by a manual operation even while the trimming mode is canceled, an unexpected shake can be prevented by performing a warning display (not shown), e.g., flickering of a display light-emitting diode on a side of the finder screen in accordance with the magnitude of a shake.

As described above, with the series of flow charts, a proper trimming size is determined and controlled on the basis of the brightness information of the print area set in accordance with a trimming instruction, thereby preventing a shake in a trimming operation.

As a shake prevention technique, the above-described embodiment employs a technique of determining a trimming magnification, i.e., the size of a print area after a trimming operation, in a case wherein the trimming photographic mode is selected, on the basis of the magnitude of a detected shake, thereby suppressing the influence of the shake.

The second embodiment will be described next, which uses a technique of allowing the shutter to be released when the magnitude of a shake is equal to or smaller than a predetermined value after a second release operation is performed, as a technique of preventing a shake when the trimming photographic mode is set.

FIGS. 12 to 15 are flow charts for explaining the operation of the second embodiment. The same processing operations as those in the first embodiment will be understood with reference to the corresponding step numbers, and only different portions will be described. Since the arrangement of the second embodiment is the same as that of the first embodiment, a description thereof will be omitted.

Figure 12:
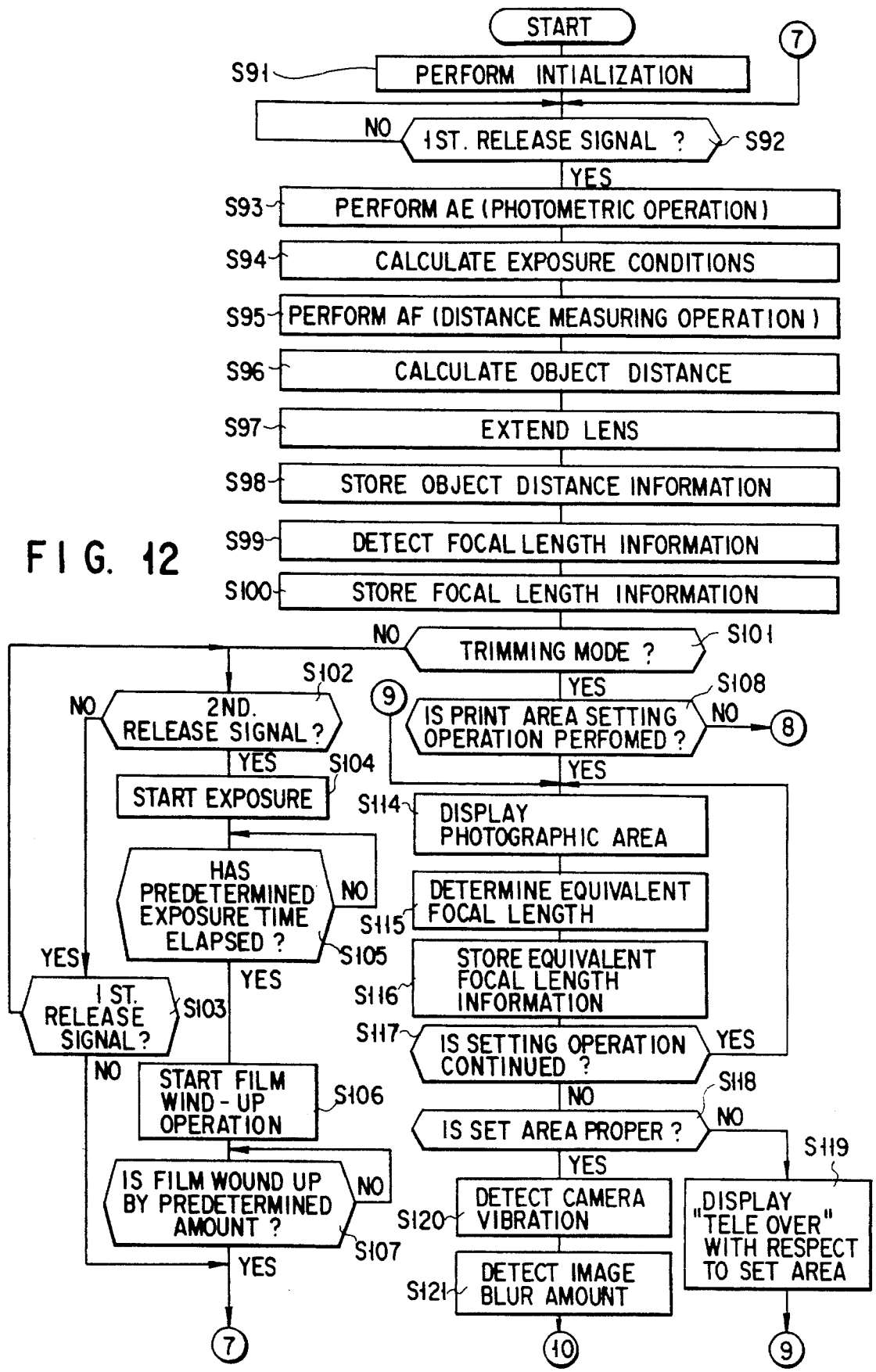
FIG. 12 is a flow chart for explaining an operation of a camera according to the second embodiment of the present invention.

First, in step S91 in FIG. 12, initialization will be performed. In this initialization processing, resetting of a shake flag indicating the state of a shake (to be described later) is also performed, in addition to initialization of predetermined operations of the camera. In step S92, it is checked whether a fast (1st.) release signal for the camera is input. Subsequently, in steps S93 to S107, the same processing as that in steps S3 to S17 in the first embodiment is performed.

Figure 13:
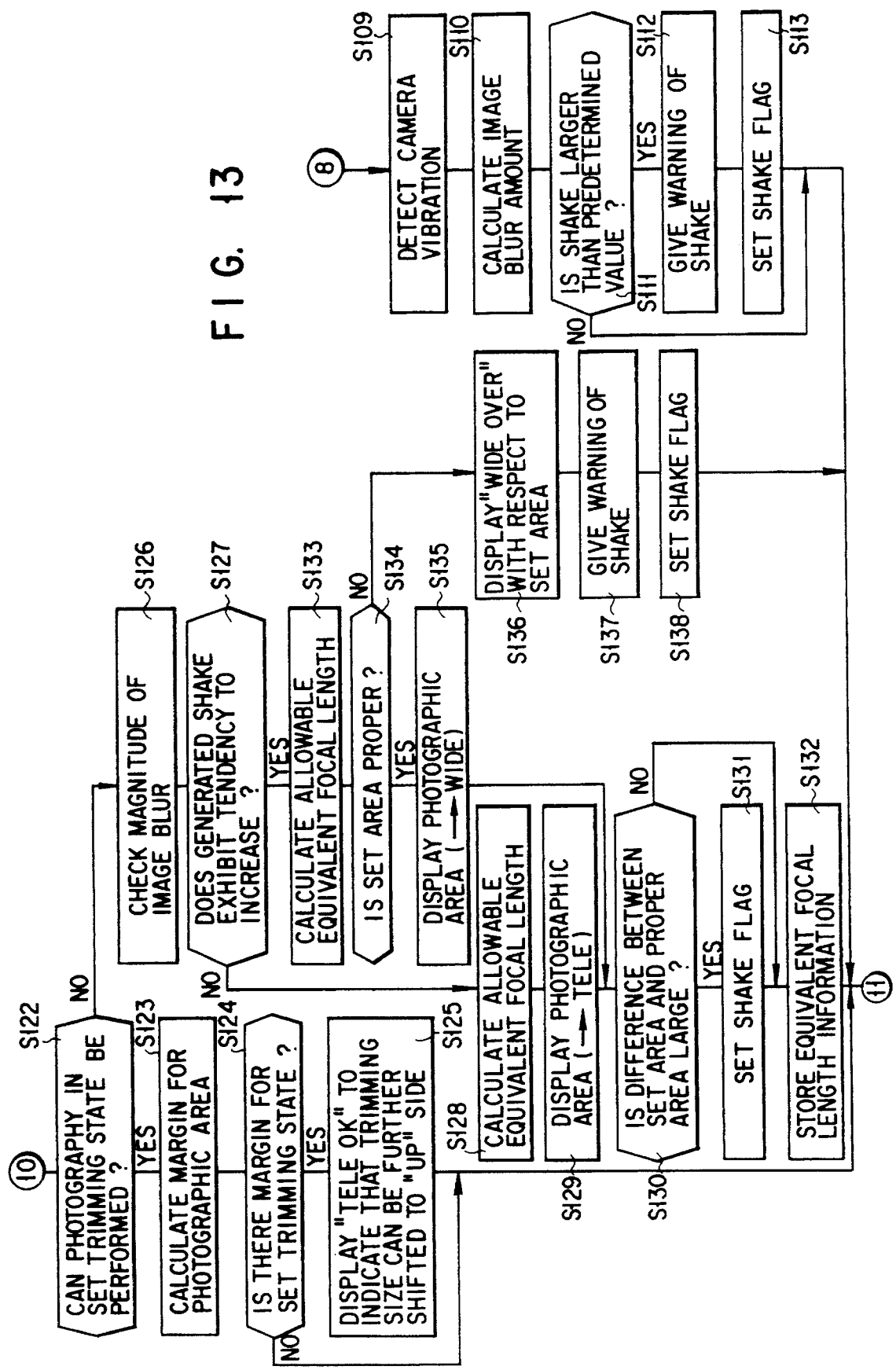
FIG. 13 is a flow chart for explaining an operation of the camera according to the second embodiment of the present invention.
Figure 14:
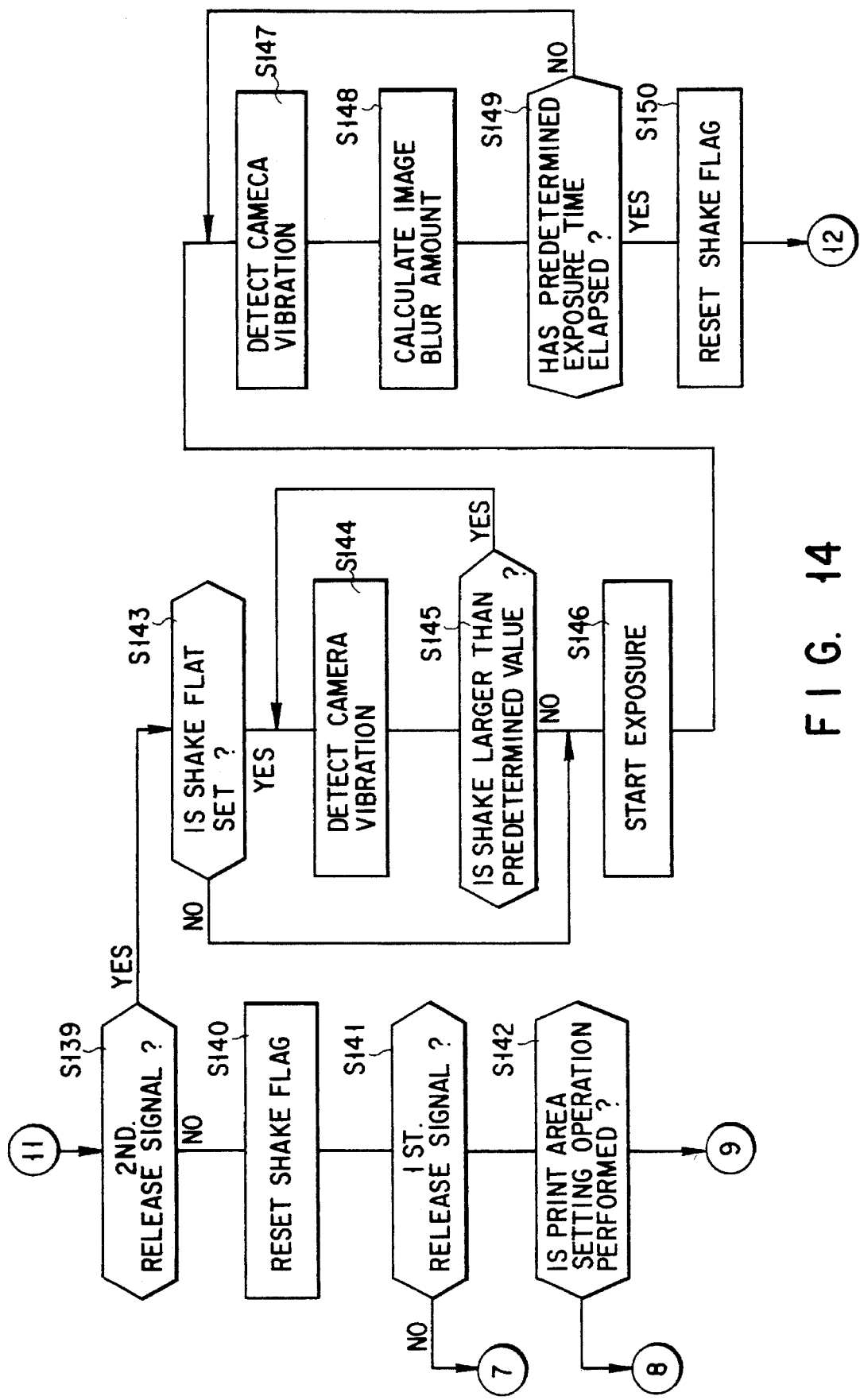
FIG. 14 is a flow chart for explaining an operation of the camera according to the second embodiment of the present invention.
Figure 15:
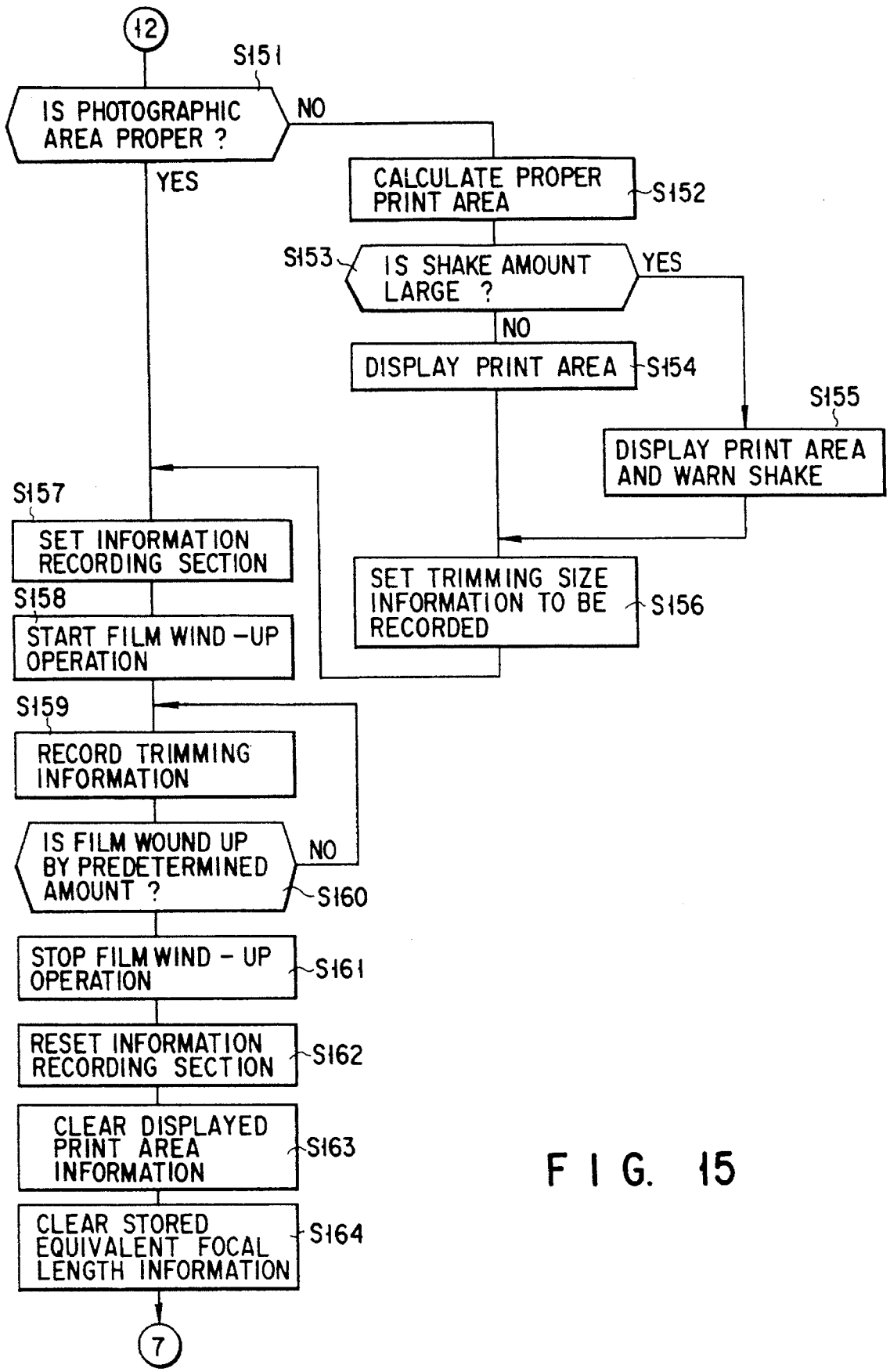
FIG. 15 is a flow chart for explaining an operation of the camera according to the second embodiment of the present invention.

If it is determined in step S108 that a print area in the trimming mode is not set even though the trimming mode is selected, the flow advances to step S109 in FIG. 13. In step S109, similar to step S120, a camera shake is detected by a vibration detecting section 12. In step S110, an image blur amount, an image blur speed, and the like are calculated on the basis of this detecting operation. Note that shake calculations in this case are performed on the basis of a normal focal length f instead of an equivalent focal length ft.

The flow then advances to step S111 to check whether the shake calculated in step S110 is at an allowable level or not. If the shake exceeds the allowable level, a warning about the shake is given to the photographer on the camera side in step S112. In step S113, the shake flag is set to output information indicating that the shake is large. The flow then advances to step S139 in FIG. 14 (to be described later). If it is determined in step S111 that the shake is at the allowable level, the flow advances to step S139.

If it is determined in step S134 in FIG. 13 that an allowable equivalent focal length ft" determined in step S133 is proper, the flow advances to step S135 to display a proper photographic area on the print area display section 5. More specifically, the print area frame shown in FIG. 9B is displayed in the direction to increase the area to be wider than the current area to make the influence of the generated shake unnoticeable. This display sample is shown in FIG. 9F (the display frame moved in the direction indicated by the outward arrow, in this case). The flow advances to step S130 to compare the (trimming) print area initially set by the photographer with the print area changed to eliminate the influence of the shake. This is because the photographer's will is not reflected if the difference between the set print area and the changed print area is too much. If it is determined upon this comparison that the difference is larger than a predetermined value (e.g., twice), the flow advances to step S131 to set the shake flag so as to output information indicating that the shake is large. The flow then advances to step S132.

If it is determined in step S130 that the difference between the above-mention set print area and the changed print area is smaller than a predetermined value (e.g., twice), the flow advances to step S132. In step S132, equivalent focal length information corresponding to this display is stored in place of the information stored in step S116. Thereafter, the flow advances to step S139 in FIG. 14.

If it is determined in step S134 that the allowable equivalent focal length ft" determined in step S133 is not proper, the flow advances to step S136. In steps S136 and S137, "WIDE OVER" is displayed to notify the photographer that it is difficult to eliminate the influence of the shake not only in a trimming photographic operation with the present area set by the photographer but also in a photographic operation with a wider print area. By flickering this display, it is also notified that a large shake is generated. The flow then advances to step S138. In step S138, similar to step S131 described above, the shake flag is set to output information indicating that the shake is large. The flow then advances to step S139. FIG. 9E shows an example of the display "WIDE OVER".

If it is determined in step S127 that the generated shake exhibits a tendency to decrease, the flow advances to step S128 to calculate an equivalent focal length corresponding to a print area in which the influence of the shake is unnoticeable. In step S129, a proper photographic area is displayed on the print area display section 5 on the basis of the allowable equivalent focal length ft' determined in step S128. More specifically, the print area frame shown in FIG. 9B is displayed in the direction in which the area is closer to the print area initially set by the photographer. FIG. 9F shows an example of this display. Subsequently, the flow advances to step S130 to compare the (trimming) print area initially set by the photographer with the print area changed to suppress the influence of the shake. This is because the photographer's will is not reflected if the difference between the set print area and the changed print area is too much. If it is determined upon this comparison that the difference is larger than a predetermined value (e.g., twice), the flow advances to step S131 to set the shake flag so as to output information indicating that the shake is large. The flow then advances to step S132. If it is determined in step S130 that the difference between the above-mention set print area and the changed print area is smaller than a predetermined value (e.g., twice), the flow advances to step S132. In step S132, equivalent focal length information corresponding to this display is stored in place of the information stored in step S116. Thereafter, the flow advances to step S139.

In step S139, it is checked whether a second (2nd.) release signal for the camera is input. This 2nd. release signal corresponds to a fully depressed state of the exposure start determining section 8. If the 2nd. release signal is not input, the flow advances to step S140. Otherwise, the flow advances to step S143. In step S140, the shake flag, which has been set when the shake is large, is reset. This reset operation may be performed when a shake (vibration) detected next is smaller than a predetermined value.

If it is determined in step S139 that the 2nd. release signal is input, the flow advances to step S143 to check whether the shake flag, which is set when the shake is larger than an allowable value, is set. If the shake flag is set, the flow advances to step S144 to detect the vibration of the camera again and calculate a shake. The flow then advances to step S145 to check whether the shake is larger than a predetermined value. Assume that the shake is large. In this case, if a photographic operation is performed, the obtained photograph is blurred. For this reason, the flow returns to step S144 to detect the vibration of the camera and calculate a shake again. If the shake becomes smaller than the predetermined value, the flow advances to step S146. Note that if it is determined in step S143 that the shake flag is not set, it means that the shake is at an allowable level. Therefore, in this case, the flow advances to step S146.

In step S146, an exposure operation of the camera is started. In steps S147 and S148, detection of the vibration of the camera and calculation of an image blur amount described above are performed. In step S149, it is checked whether a predetermined exposure time has elapsed. If YES in step S149, the exposure operation is stopped, and the flow advances to step S150 to reset the shake flag, similar to step S140. The flow then advances to step S151 in FIG. 15 to check whether the photographic area in the exposure operation is proper.

Figure 8:
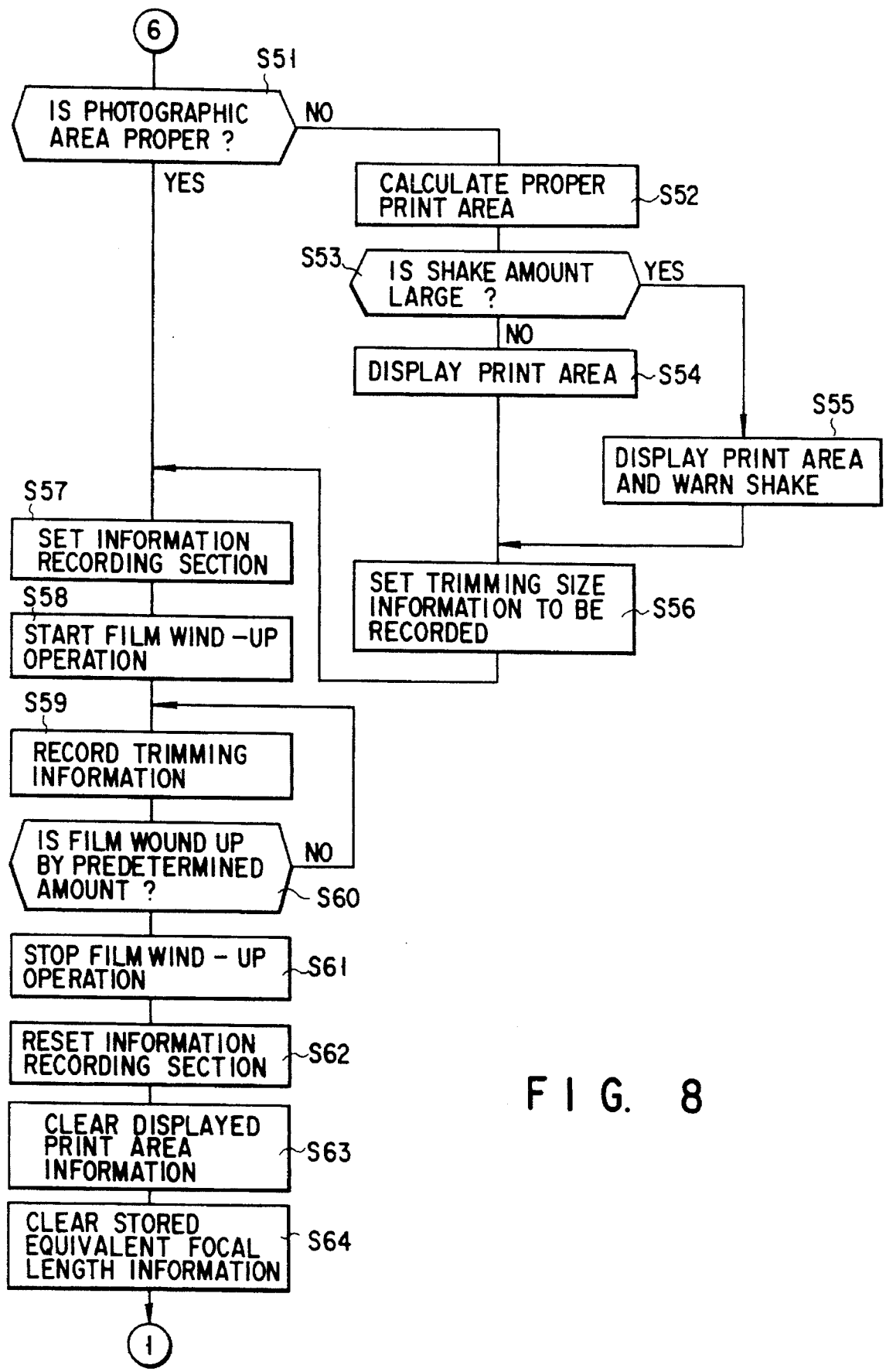
FIG. 8 is a flow chart for explaining an operation of the camera in FIG. 4.

Note that the operations in steps S93 to S107, S114 to S127, S141, S142, and S151 to S164 in FIGS. 12 to 15 are the same as those in steps S3 to S17, S22 to S35, S45, S46, and S51 to S64 in FIGS. 6 to 8 in the first embodiment, and hence a description thereof will be omitted.

As has been described above, according to the present invention, in a camera having a hand shake preventing device and capable of selecting a trimming mode photographic operation, which can designate an area narrower than a normal photographic area as a print area, even when the trimming mode is selected, a deterioration in image quality due to a hand shake can be easily prevented.

In addition, according to the present invention, in a camera capable of designating an area narrower than a normal photographic area as a print area and designating a trimming size, a proper trimming size can be determined and controlled on the basis of the state of a trimming photographic area, and can be notified to a photographer. With this operation, an image blur of a photograph obtained on the basis of a trimming photographic instruction can be reduced and made unnoticeable.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A trimming camera which designates a print range narrower than a normal photographic frame and records the print range, comprising:

print area setting means for manually setting the print range;

focal length detecting means for detecting a focal length of said trimming camera;

equivalent focal length calculating means for calculating an equivalent focal length on the basis of the focal length of said trimming camera, detected by said focal length detecting means, and the print range set by said print area setting means;

shake amount detecting means for detecting a value associated with a shake amount of said trimming camera;

image blur calculating means for calculating an image blur amount at the equivalent focal length on the basis of the equivalent focal length calculated by said equivalent focal length calculating means and the value associated with the shake amount, detected by said shake amount detecting means;

determining means for determining whether the image blur amount calculated by said image blur amount calculation means falls within a predetermined range;

limiting means for limiting the print range set by said print area setting means when said determining means determines that the image blur amount falls outside the predetermined range; and display means for displaying the print range limited by said limiting means.

2. A camera according to claim 1, further comprising:

margin calculating means for calculating a margin for a photographic range when said limiting means determines that the image blur amount falls within the predetermined range; and display means for displaying the margin calculated by said margin calculating means.

3. A camera according to claim 1, further comprising:

blur amount increase/decrease determining means for determining whether the image blur amount calculated by said image blur amount calculating means exhibits a tendency to decrease or increase;

allowable equivalent focal length calculating means for calculating an allowable equivalent focal length allowed with respect to the image blur amount calculated by said image blur amount calculating means when said blur amount increase/decrease determining means determines that the blur amount exhibits a tendency to decrease; and means for causing said display means to display a print range corresponding to the allowable equivalent focal length calculated by said allowable equivalent focal length calculating means.

4. A camera according to claim 1, further comprising:

blur amount increase/decrease determining means for determining whether the image blur amount calculated by said image blur amount calculating means exhibits a tendency to decrease or increase;

allowable equivalent focal length calculating means for calculating an allowable equivalent focal length allowed with respect to the image blur amount calculated by said image blur amount calculating means when said blur amount increase/decrease determining means determines that the blur amount exhibits a tendency to increase; and means for causing said display means to display a print range corresponding to the allowable equivalent focal length calculated by said allowable equivalent focal length calculating means.

5. A camera according to claim 4, further comprising warning means for performing a warning display when an influence of a shake is noticeable with the allowable equivalent focal length calculated by said allowable equivalent focal length calculating means, even in a photographic operation with an actual focal length of a photographic lens.

6. A camera according to claim 1, further comprising:

storage means for storing the shake amount detected by said shake detecting means during an exposure operation of said trimming camera;

photographic range properness determining means for determining, on the basis of the shake amount detected during the exposure operation and stored in said storage means, whether the print range set by said print area setting means is proper;

changing means for changing the print range when said photographic range properness determining means determines that the print range is improper because the shake amount is large; and means for causing said display means to display the changed print range obtained by said changing means.

7. A camera according to claim 1, further comprising information recording means for recording the print range limited by said limiting means on an information recording portion of a film.

8. A camera according to claim 1, wherein said equivalent focal length calculating means includes means for obtaining the equivalent focal length by multiplying a ratio of the print range to a normal print range by the focal length detected by said focal length detecting means.

9. A trimming camera which records a print range with respect to a photographic frame, comprising:

print area setting means for setting the print range;

shake detecting means for detecting a value associated with a shake amount of said trimming camera;

image blur amount calculating means for calculating an image blur amount on the basis of the value associated with the shake amount, detected by said shake detecting means;

determining means for determining whether the image blur amount calculated by said image blur amount calculating means falls within a predetermined range;

limiting means for limiting the print range set by said print area setting means when said determining means determines that the image blur amount falls outside the predetermined range; and display means for displaying the print range limited by said limiting means.

10. A camera according to claim 9, further comprising information recording means for recording the print range on an information recording portion of a film.

11. A camera according to claim 9, wherein said limiting means limits the print range to a print range in which the image blur amount calculated by said image blur amount calculating means is allowed.

12. A camera according to claim 9, wherein said determining means causes said display means to display a print range limit allowed on the basis of the image blur amount when it is determined that the image blur amount falls within the predetermined range.

13. A camera according to claim 9, further comprising:
storage means for storing an output from said shake amount detecting means during an exposure operation of said trimming camera;
determining means for determining whether the output from said shake detecting means during the exposure operation falls within a predetermined range; and
changing means for changing the print range when the image blur amount falls outside the predetermined range.

14. A trimming camera which records a print range with respect to a photographic frame, comprising:
print area setting means for setting the print range;
shake detecting means for detecting a value associated with a shake amount of said trimming camera;
image blur amount calculating means for calculating an image blur amount on the basis of the value associated with the shake amount, detected by said shake detecting means;
determining means for determining on the basis of the image blur amount calculated by said image blur amount calculating means whether or not the print range set by said print area setting means is allowed with respect to the shake amount detected by said shake detecting means; and
displaying means for displaying a result of a determination by said determining means.

15. A trimming camera which records a print range with respect to a photographic frame, comprising:
print area setting means for setting the print range;
shake detecting means for detecting a value associated with a shake amount of said trimming camera;
print range setting means for setting an allowable print range within which degradation of an image quality is allowed, on the basis of the shake amount detected by said shake detecting means; and
display means for displaying the print range set by said print area setting means and the allowable print range set by said print range setting means.

16. A trimming camera which records a print range with respect to a photographic frame, comprising:
print area setting means for setting the print range;
shake amount detecting means for detecting a value associated with a shake amount of said trimming camera during an exposure operation of said trimming camera;
storage means for storing an output from said shake amount detecting means during the exposure operation of said trimming camera;
determining means for determining whether the output from said shake amount detecting means during the exposure operation falls within a predetermined range; and
changing means for changing the print range set by said print area setting means when said determining means determines that the shake amount falls outside the predetermined range.

17. A camera according to claim 16, further comprising display means for displaying the changed print range which was changed by said changing means.

18. A camera according to claim 16, further comprising recording means for recording the changed print range on a recording portion of a film loaded in said trimming camera when the print range is changed by said changing means, and recording the print range set by said print area setting means on the recording portion of the film when the print range is not changed by said changing means.

19. A trimming camera which records a print range with respect to a photographic frame, comprising:
shake amount detecting means for detecting a shake amount of said trimming camera;
shake preventing means for preventing an influence of a shake by using the shake amount detected by said shake amount detecting means;
shake prevention mode selecting means for manually selecting to operate said shake preventing means;
trimming mode setting means for setting a photographic operation in a print range narrower than a normal print range; and
automatic selecting means for automatically operating said shake preventing means when the narrower print range is designated by said trimming mode setting means.

20. A camera according to claim 19, further comprising display means for displaying the print range set by said trimming mode setting means.

21. A camera according to claim 19, wherein said shake preventing means includes means for permitting an exposure operation of said trimming camera when the shake amount detected by said shake amount detecting means is smaller than a predetermined value.

22. A camera according to claim 19, wherein said shake preventing means performs a warning display when the shake amount detected by said shake amount detecting means is larger than a predetermined value.

23. A trimming camera capable of setting a printing operation with respect to a normal photographic frame and a frame range narrower than the normal photographic frame, comprising:
shake amount detecting means for detecting a shake amount of said trimming camera;
shake preventing means for causing said trimming camera to perform a photographic operation in which an influence of a shake is prevented on the basis of the shake amount detected by said shake amount detecting means;
trimming mode setting means for setting an operation of printing to a frame range narrower than the normal photographic frame; and
means for causing said shake preventing means to operate as a function of the setting of said trimming mode setting means.

24. A camera according to claim 23, further comprising cancel means for forcibly canceling an operation of said shake preventing means.

25. A camera capable of selecting a normal photographic mode in which a normal photographic range is set, and a trimming photographic mode in which a trimming photographic range narrower than the normal photographic range is set, comprising:

trimming photographic range signal output means for outputting a photographic range signal indicating the trimming photographic range;

photographic range display means for displaying the trimming photographic range on the basis of an output from said trimming photographic range signal output means;

shake information detecting means for detecting shake information influencing a photographed image within the trimming photographic range; and photographic range correcting means for correcting the output from said trimming photographic range signal output means on the basis of an output from said shake information detecting means.

26. A camera according to claim 25, further comprising:

determining means for determining on the basis of an output from said photographic range correcting means whether the corrected photographic range can be set; and second display means for performing a display on the basis of an output from said determining means.

27. A camera capable of selecting a normal photographic mode in which a normal photographic range is set, and a trimming photographic mode in which a trimming photographic range narrower than the normal photographic range is set by using an operation member, comprising:

trimming photographic range information output means for outputting information corresponding to the trimming photographic range;

shake information output means for detecting a shake state of said camera and for outputting shake information;

allowable shake amount output means for outputting an allowable shake amount on a frame photographed by said camera; and correcting means for correcting the trimming photographic range on the basis of an output from said trimming photographic range information output means, an output from said shake information output means, and an output from said allowable shake amount output means.

28. A camera according to claim 27, further comprising:

determining means for determining on the basis of an output from said correcting means whether the corrected trimming photographic range can be set; and display means for performing a display on the basis of an output from said determining means.

29. A camera capable of selecting a normal photographic mode in which a normal photographic range is set, and a trimming photographic mode in which a trimming photographic range narrower than the normal photographic range is set by using an operation member, comprising:

trimming photographic range information output means for outputting information corresponding to the trimming photographic range;

shake information output means for detecting a shake state of said camera and for outputting shake information;

allowable shake amount output means for outputting an allowable shake amount on a frame photographed by said camera; and determining means for determining whether a print frame on which an influence of the shake is small can be obtained within the trimming photographic range, on the basis of the trimming photographic range information which is output from said trimming photographic range information output means, an output from said shake information output means, and an output from said allowable shake amount output means.

30. A camera according to claim 29, further comprising correcting means for correcting the trimming photographic range on the basis of an output from said determining means.

31. A camera according to claim 30, further comprising:

determining means for determining on the basis of an output from said correcting means whether the corrected trimming photographic range can be set; and display means for performing a display on the basis of an output from said determining means.

32. A camera capable of selecting a normal photographic mode in which a normal photographic range is set, and a trimming photographic mode in which a trimming photographic range narrower than the normal photographic range is set by using an operation member, comprising:

trimming photographic range information output means for outputting information corresponding to the trimming photographic range;

allowable shake amount output means for outputting an allowable shake amount on a frame photographed by said camera;

start signal output means for outputting a signal for starting a photographic operation;

photographing means for performing a photographic operation in response to an output from said start signal output means;

shake information output means for detecting a shake state of said camera during a photographic operation of said photographing means and for outputting shake information; and correcting means for correcting the trimming photographic range on the basis of an output from said trimming photographic range information output means, an output from said shake information output means, and an output from said allowable shake amount output means.

33. A camera according to claim 32, further comprising:

determining means for determining on the basis of an output from said correcting means whether the corrected trimming photographic range can be set; and display means for performing a display on the basis of an output from said determining means.

34. A camera according to claim 32, further comprising:

determining means for determining on the basis of an output from said correcting means whether the corrected trimming photographic range can be set; and setting means for forcibly setting the photographic range to a predetermined range on the basis of an output from said determining means.

35. A camera capable of selecting a normal photographic mode in which a normal photographic range is set, and a trimming photographic mode in which a trimming photographic range narrower than the normal photographic range is set by using an operation member, comprising:

trimming photographic range information output means for outputting information corresponding to the trimming photographic range;

recording means for recording the trimming photographic range information on a recording medium;

allowable shake amount output means for outputting an allowable shake amount on a frame photographed by said camera;

start signal output means for outputting a signal for starting a photographic operation;

photographing means for performing a photographic operation in response to an output from said start signal output means;

shake information output means for detecting a shake state of said camera during a photographic operation of said photographing means and for outputting shake information; and correcting means for correcting the trimming photographic range information recorded by said recording means on the basis of an output from said trimming photographic range information output means, an output from said shake information output means, and an output from said allowable shake amount output means.

36. A camera according to claim 35, further comprising:

determining means for determining on the basis of an output from said correcting means whether the corrected trimming photographic range can be set; and display means for performing a display on the basis of an output from said determining means.

* * * * *